(12) United States Patent
Baba

(10) Patent No.: US 8,819,522 B2
(45) Date of Patent: Aug. 26, 2014

(54) STORAGE DEVICE ARRAY SYSTEM, INFORMATION PROCESSING APPARATUS, STORAGE DEVICE ARRAY CONTROL METHOD, AND PROGRAM

(75) Inventor: Tatsuru Baba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 13/100,109

(22) Filed: May 3, 2011

(65) Prior Publication Data

US 2011/0276859 A1   Nov. 10, 2011

(30) Foreign Application Priority Data

May 7, 2010   (JP) .................................. 2010-107412

(51) Int. Cl.
*G11C 29/24* (2006.01)
*G11C 29/54* (2006.01)

(52) U.S. Cl.
USPC .......................................... 714/770; 714/718

(58) Field of Classification Search
None
See application file for complete search history.

(56) References Cited

U.S. PATENT DOCUMENTS

| 6,772,286 | B2 | 8/2004 | Sasamoto et al. |
| 2002/0073279 | A1 | 6/2002 | Sasamoto et al. |
| 2006/0107098 | A1* | 5/2006 | Maki et al. ........................ 714/6 |
| 2006/0136654 | A1* | 6/2006 | Franklin ........................ 711/103 |
| 2009/0217086 | A1* | 8/2009 | Tanaka et al. ..................... 714/8 |
| 2010/0017683 | A1* | 1/2010 | Nishimiya .................... 714/769 |
| 2010/0107012 | A1* | 4/2010 | Gooding ........................ 714/37 |

FOREIGN PATENT DOCUMENTS

| JP | 08-185274 A | 7/1996 |
| JP | 09-305326 A | 11/1997 |
| JP | 2002-175158 A | 6/2002 |
| JP | 2004-062376 A | 2/2004 |

\* cited by examiner

*Primary Examiner* — Ajay Bhatia
*Assistant Examiner* — Dipakkumar Gandhi
(74) *Attorney, Agent, or Firm* — Canon U.S.A., Inc. IP Division

(57) ABSTRACT

A disk array apparatus, if a rebuild error occurs, stores information indicating an error occurrence place in a sector holding unit, and then stops rebuild processing. A host computer, if a rebuild error occurs in the disk array apparatus, acquires the information indicating the error occurrence place from the disk array apparatus. The host computer determines whether the rebuild error does not obstruct continuation of the rebuild processing based on the acquired information indicating the error occurrence place. If it is determined that the rebuild error does not obstruct continuation of the rebuild processing, the host computer instructs the disk array apparatus to resume the rebuild processing while skipping the error occurrence place. In response to the instruction from the host computer, the disk array apparatus resumes the rebuild processing while skipping the error occurrence place.

5 Claims, 13 Drawing Sheets

FIG.6
600

| REGISTER | Bit 7 | Bit 6 | Bit 5 | Bit 4 | Bit 3 | Bit 2 | Bit 1 | Bit 0 |
|---|---|---|---|---|---|---|---|---|
| 601 — Features | CONTROL ID ||||||||
| 602 — Command | 0xFF ||||||||
| 603 — C/I/D | 1 | 0 | 0 | 0x0 |||||
| 604 — FIS Type | 0x27 ||||||||
| 605 — Dev/Head | 0 | 1 | 0 | 0 | 0 | 0 | 0 | 0 |
| 606 — Cyl High | 0x0 ||||||||
| 607 — Cyl Low | 0x0 ||||||||
| 608 — Sec Num | 0x0 ||||||||
| 609 — Features(exp) | 0x0 ||||||||
| 610 — Cyl High(exp) | 0x0 ||||||||
| 611 — Cyl Low(exp) | 0x0 ||||||||
| 612 — Sec Num(exp) | 0x0 ||||||||
| 613 — Control | 0x0 ||||||||
| 616 — Reserved | 0x0 ||||||||
| 614 — Sec Cnt(exp) | 0x0 ||||||||
| 615 — Sec Cnt | 0x0 ||||||||
| 616 — Reserved | 0x0 ||||||||
| 616 — Reserved | 0x0 ||||||||
| 616 — Reserved | 0x0 ||||||||
| 616 — Reserved | 0x0 ||||||||

FIG.7

| ADDRESS | CONTENT |
|---|---|
| 700 — 0x000~0x003 | INTERRUPT CAUSE — 701 |
| 702 — 0x004~0x1FF | Reserved — 703 |

FIG.8

| ADDRESS | CONTENT |
|---|---|
| 710 — 0x000~0x003 | FAULTY SECTOR (LOWER 28 [bit]) — 711 |
| 712 — 0x004~0x007 | FAULTY SECTOR (UPPER 20 [bit]) — 713 |
| 714 — 0x008~0x00B | FAILED HDD ID — 715 |
| 716 — 0x00C~0x00F | FAILED HDD CHANNEL — 717 |
| 718 — 0x010~0x1FF | Reserved — 719 |

FIG.9

| ADDRESS | CONTENT |
|---|---|
| 720 — 0x000~0x003 | REBUILD PROCESSING START SECTOR (LOWER 28 [bit]) — 721 |
| 722 — 0x004~0x007 | REBUILD PROCESSING START SECTOR (UPPER 20 [bit]) — 723 |
| 724 — 0x008~0x00B | REBUILD PROCESSING END SECTOR (LOWER 28 [bit]) — 725 |
| 726 — 0x00C~0x00F | REBUILD PROCESSING END SECTOR (UPPER 20 [bit]) — 727 |
| 728 — 0x010~0x1FF | Reserved — 729 |

STORAGE DEVICE ARRAY SYSTEM, INFORMATION PROCESSING APPARATUS, STORAGE DEVICE ARRAY CONTROL METHOD, AND PROGRAM

BACKGROUND OF THE INVENTION

1. Field of the Invention

The present invention relates to a storage device array system, an information processing apparatus, a storage device array control method, and a program.

2. Description of the Related Art

In general, a disk array apparatus includes a disk array and a disk array controller. The disk array includes a plurality of magnetic disk drives (hereinafter, referred to as "HDDs"). The array controller can control access to each HDD (i.e., a member HDD) of the disk array.

To improve the reliability, the disk array apparatus is generally configured to store the same data in each of the plurality of HDDs. Further, to increase an access speed, the disk array apparatus causes the plurality of HDDs to operate in parallel with each other for discrete reading/writing processing.

The disk array controller receives writing data from the host computer and transfers the received writing data to the plurality of HDDs. Alternatively, the disk array controller can generate redundant data, as data correction information, to be attached to the writing data and can transfer the generated redundant data to any one of the plurality of HDDs.

Thus, in a case where one of a plurality of HDDs fails, the disk array controller can restore data in a failed HDD based on the redundant data or based on both the redundant data and the data in the remaining HDDs.

One of conventionally known data redundancy methods is a Redundant Arrays of Inexpensive Disks (RAID) method. The RAID method is characterized by the usage of a plurality of RAID levels classified considering a relationship between RAID data and redundant data, in which RAID level 1 and RAID level 5 are representative RAID levels.

The RAID level 1 requires at least two HDDs. When the RAID level is RAID level 1, the disk array controller transfers the writing data received from the host computer to each of the plurality of HDDs. In other words, the disk array controller writes the same data into two or more HDDs. According to the above-described configuration for realizing the RAID level 1, if one HDD is failed, the disk array controller switches the failed HDD to another HDD (i.e., a new HDD) to improve the reliability. Further, the disk array controller copies all data of the failed HDD to the new HDD to restore the data.

The RAID level 5 requires at least three HDDs. For example, if N represents the total number of HDDs required to realize the RAID level 5, the disk array controller divides the writing data received from the host computer and distributes the divided data to N−1 HDDs. Further, the disk array controller performs an exclusive OR operation on the divided data and transfers a calculation result (parity data) to the remaining one HDD. When the RAID level is RAID level 5, an HDD dedicated to the parity data is not provided and the disk array controller distributes the parity data in all HDDs.

Further, in data update processing, the disk array controller reads pre-writing data (old data) stored in an internal area of the HDD, which serves as a storage destination of the writing data. The disk array controller further reads pre-update parity data (old parity data) stored in an area of another HDD corresponding to the storage destination of the writing data. Then, the disk array controller performs an exclusive OR operation on the writing data (new data) received from the host computer and the old data/old parity data to generate updated parity data (new parity data). The disk array controller updates the original parity data based on the updated parity data.

When the RAID level is RAID level 5, if one HDD has failed, the disk array controller reads data for each stripe, which is the units to manage a disk area of the disk array, from another HDD. The disk array controller performs an exclusive OR operation on the readout data. Using the RAID function enables restoring data of the failed HDD in a new HDD.

The disk array apparatus having the above-described RAID configuration can realize data recovery of a failed HDD. On the other hand, when an HDD has a large capacity, an unused area of the HDD may increase during the recovery of the HDD. In this case, if a faulty sector of an unused area of the HDD is detected, the processing for recovering the HDD may stop and the effect of improving the reliability according to the RAID method cannot be obtained as intended.

Considering the above-described situation, as discussed in Japanese Patent Application Laid-Open No. 2002-175158, an HDD management table can be provided in the disk array apparatus. According to the discussed conventional technique, the disk array apparatus determines whether a failure occurrence position in the HDD is a used area with reference to the HDD management table. Further, the disk array apparatus restores only the data stored in the used area of the HDD. Using the above-described conventional technique is effective to eliminate adverse effects of faulty sectors in unused areas.

However, in a case where a failure occurrence rate of the HDD is relatively low, the following problem may arise if the disk array apparatus is configured to include the HDD management table and functionally operate to determine the necessity of recovery. For example, the cost of the disk array apparatus may increase. The configuration of the disk array apparatus may become complicated. Further, the HDD access performance may deteriorate due to updating of the HDD management table.

In this case, to prevent the HDD access performance from deteriorating, it may be effective to extend the update interval of the HDD management table. However, if the update interval of the HDD management table is extended, an actual usage state of the HDD may not coincide with information of the HDD management table. In the worst case, even when a failure occurs in a used area, the disk array apparatus may erroneously determine that the data recovery is unnecessary.

SUMMARY OF THE INVENTION

The present invention is directed to a method capable of surely performing data recovery based on rebuild processing without deteriorating the performance and without increasing the cost. Further, the present invention is directed to a method capable of continuously performing the rebuild processing if a detected error can be disregarded, for example, when an error occurs in an unused area.

According to an aspect of the present invention, a storage device array system includes a control apparatus capable of controlling an operation of a storage device array including a plurality of storage devices and an information processing apparatus capable of accessing the plurality of storage devices via the control apparatus. The control apparatus includes a rebuild unit configured to execute rebuild processing for restoring data stored in any one of the plurality of storage devices based on data stored in another storage device, a storing unit configured to store information indicating an error occurrence place in the storage device if an error occurs during the rebuild processing, and a transmission unit configured to transmit the information indicating the error occurrence place stored in the storing unit to the information processing apparatus. The information processing apparatus includes an acquisition unit configured to acquire the information indicating the error occurrence place transmitted from the transmission unit, a determination unit configured to determine whether an error having occurred during the rebuild processing does not obstruct continuation of the rebuild processing based on the information indicating the error occurrence place acquired by the acquisition unit, and a control unit configured to instruct the control apparatus to skip the error occurrence place and resume the rebuild processing if the determination unit determines that the error having occurred during the rebuild processing does not obstruct continuation of the rebuild processing. The rebuild unit is configured to stop the rebuild processing if an error occurs during the rebuild processing and resume the rebuild processing while skipping the error occurrence place if the control unit instructs the control apparatus to resume the rebuild processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the invention.

FIG. 6 illustrates an example format usable for a control command to be used in the disk array system according to the first exemplary embodiment of the present invention.

FIG. 7 illustrates an example format usable for interrupt cause information that can be transmitted from the disk array apparatus to the host computer.

FIG. 8 illustrates an example format usable for faulty sector information that can be transmitted from the disk array apparatus to the host computer.

FIG. 9 illustrates an example format usable for rebuild processing start sector information and rebuild processing end sector information that can be transmitted from the host computer to the disk array apparatus.

DESCRIPTION OF THE EMBODIMENTS

Various exemplary embodiments, features, and aspects of the invention will be described in detail below with reference to the drawings.

Figure 1:
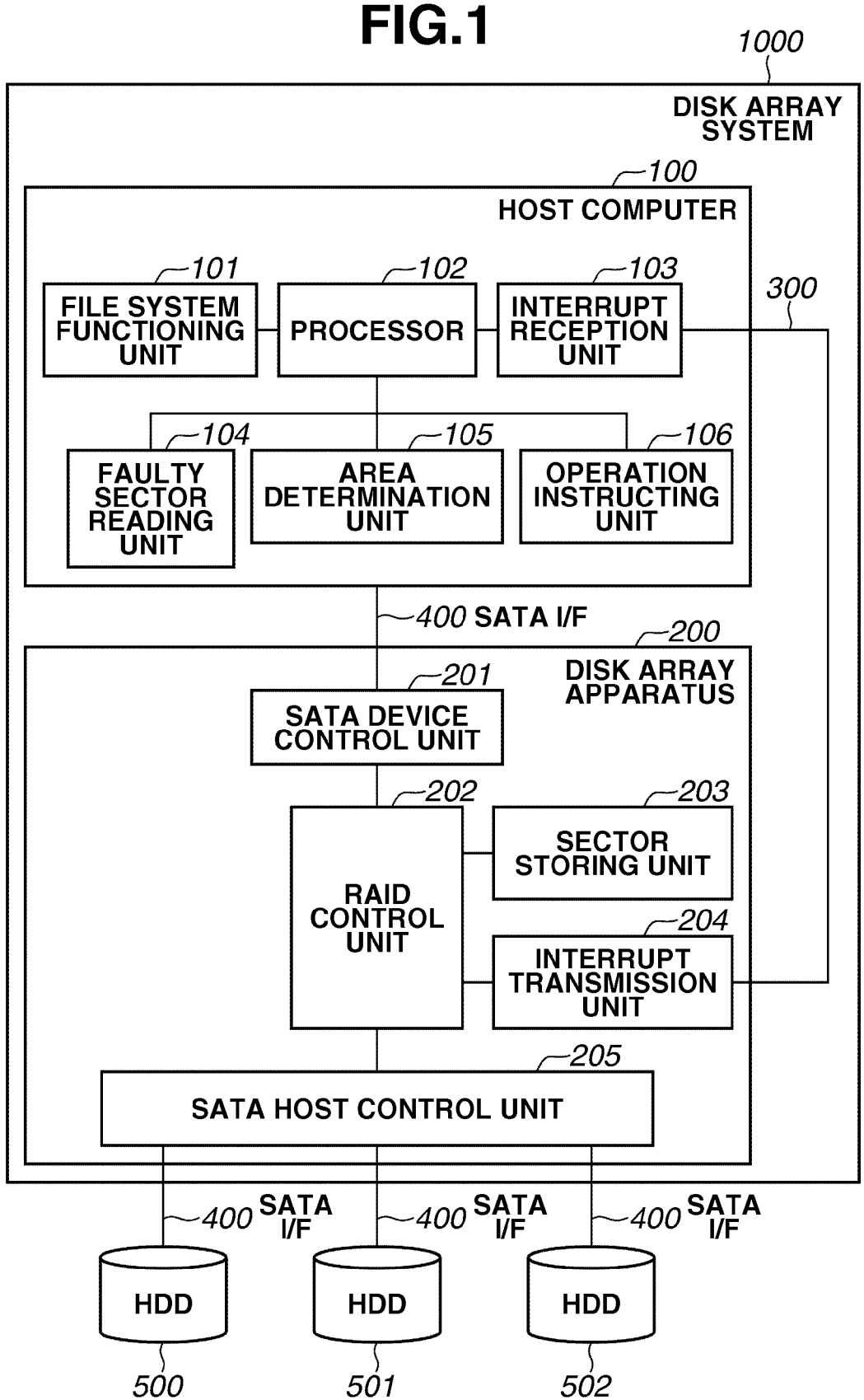
FIG. 1 illustrates a configuration of a disk array system according to a first exemplary embodiment of the present invention.

FIG. 1 illustrates a configuration of a disk array system 1000 according to a first exemplary embodiment of the present invention. As illustrated in FIG. 1, the disk array system (an example of a storage device array system) 1000 includes a host computer 100, a disk array apparatus 200, and three HDDs 500, 501, and 502. In the present exemplary embodiment, the host computer 100 is functionally operable as an information processing apparatus. Each of the HDDs 500, 501, and 502 is functionally operable as a storage device.

However, the storage device according to the present invention is not limited to the HDD. Any other storage device, such as a flash memory or a comparable semiconductor, can be used to obtain similar effects. Further, the total number of storage devices connected to the disk array apparatus 200 is not limited to three and can be two or any other value equal to or greater than four.

The host computer 100 can perform read/write processing, via the disk array apparatus 200, to read and write data from and into a storage device (e.g., one of three HDDs 500, 501, and 502). The host computer 100 is a host apparatus of the disk array apparatus 200. For example, the host computer 100 corresponds to a controller unit incorporated in a personal computer or an image processing apparatus, such as a multifunction peripheral (MFP). In the present exemplary embodiment, the storage device is not limited to the HDD and can be another semiconductor-based storage device that can obtain similar effects.

The host computer 100, the disk array apparatus 200, and three HDDs 500, 501, and 502 are mutually connected via a serial ATA interface 400. In the present exemplary embodiment, an interface usable to connect the host computer 100, the disk array apparatus 200, and three HDDs 500, 501, and 502 is not limited to the serial ATA interface 400 and can be any other interface (e.g., a Serial Attached SCSI (SAS) interface) that can obtain similar effects.

Further, the host computer 100 and the disk array apparatus 200 are mutually connected via an interrupt signal line 300. If the disk array apparatus 200 generates an interrupt signal, the host computer 100 can receive the interrupt signal via the interrupt signal line 300.

The host computer 100 includes a file system functioning unit 101, a processor 102, an interrupt reception unit 103, a faulty sector reading unit 104, an area determination unit 105, and an operation instructing unit 106.

The processor 102 is a central processing unit that can perform main control for the host computer 100. To this end, the processor 102 executes an initialization program stored in a read only memory (ROM) (not illustrated) or an HDD, an operating system (OS), and any other program. The interrupt reception unit 103 is, for example, an interrupt controller. If an interrupt is received from the disk array apparatus 200, the interrupt reception unit 103 sends a notification informing reception of the interrupt to the processor 102. As a modified embodiment, the interrupt reception unit 103 may be integrated together with the processor 102.

The file system functioning unit 101 corresponds to a file management system function included in the OS that can be executed by the processor 102. The file system functioning unit 101 can access a file stored in the HDD according to file management information (FAT 803, FAT 804, etc.) illustrated in FIG. 10. Further, the file system functioning unit 101 can manage information relating to a usage status of each area in a storage device (in an HDD) using the file management information. The file system functioning unit 101 corresponds to a function that can be realized by the processor 102 when the processor 102 executes a computer readable OS program read out from an HDD and loaded into a random access memory (RAM) (not illustrated).

The faulty sector reading unit 104 receives an instruction from the processor 102 and reads a faulty sector from the disk array apparatus 200 via the SATA I/F 400. The area determination unit 105 receives an instruction from the processor 102 and compares information relating to used area and unused area (see 803 and 804 illustrated in FIG. 10) of the HDD managed by the file system functioning unit 101 with the faulty sector read by the faulty sector reading unit 104.

Then, the area determination unit 105 determines whether the faulty sector is a used area or an unused area based on a result of the above-described comparison. The area determination unit 105 sends a notification informing a determination result to the processor 102. The operation instructing unit 106 receives an instruction from the processor 102 and instructs the disk array apparatus 200 to perform an operation.

In the present exemplary embodiment, the faulty sector reading unit 104, the area determination unit 105, and the operation instructing unit 106 can be realized by a hardware configuration or a software configuration (functions of a device driver of the disk array apparatus 200 that is operable on the OS). In a case where a software configuration is employed, the processor 102 executes a computer readable device driver program of the disk array apparatus 200 loaded into a random access memory (RAM) (not illustrated) from an HDD to realize the functions of the faulty sector reading unit 104, the area determination unit 105, and the operation instructing unit 106.

The disk array apparatus 200 includes an SATA device control unit 201, a RAID control unit 202, a sector storing unit 203, an interrupt transmission unit 204, and an SATA host control unit 205.

The SATA device control unit 201 can transmit information to the RAID control unit 202 according to a writing request or a readout request received from the host computer 100 via the SATA I/F 400. Further, the SATA device control unit 201 can transmit information to the host computer 100 according to a control signal supplied from the RAID control unit 202.

If the RAID control unit 202 receives the information from the SATA device control unit 201, the RAID control unit 202 performs "RAID" control. If the RAID control unit 202 receives an HDD failure notification from the SATA host control unit 205, the RAID control unit 202 transfers faulty sector information to the sector storing unit 203 and sends an interrupt transmission instruction to the interrupt transmission unit 204. In the present exemplary embodiment, the faulty sector information includes faulty sector, HDD failure detected HDD ID, and HDD failure detected channel information.

If the sector storing unit 203 receives the faulty sector information from the RAID control unit 202, the sector storing unit 203 stores the received faulty sector information. Further, the sector storing unit 203 sends the faulty sector information to the RAID control unit 202 in response to a faulty sector information readout request received from the RAID control unit 202.

If the interrupt transmission unit 204 receives the interrupt transmission instruction from the RAID control unit 202, the interrupt transmission unit 204 transmits an interrupt signal to the host computer 100 via the interrupt signal line 300. Further, the interrupt transmission unit 204 can clear the cause of an interrupt transmission according to an instruction from the RAID control unit 202.

Further, the interrupt transmission unit 204 can perform interrupt enable setting according to an instruction from the RAID control unit 202. As a modified exemplary embodiment, the sector storing unit 203 and the interrupt transmission unit 204 can be integrated together with the RAID control unit 202.

The SATA host control unit 205 can transmit writing and reading requests to respective HDDs 500, 501, and 502, via the SATA I/F 400, according to an instruction from the RAID control unit 202.

Figure 2:
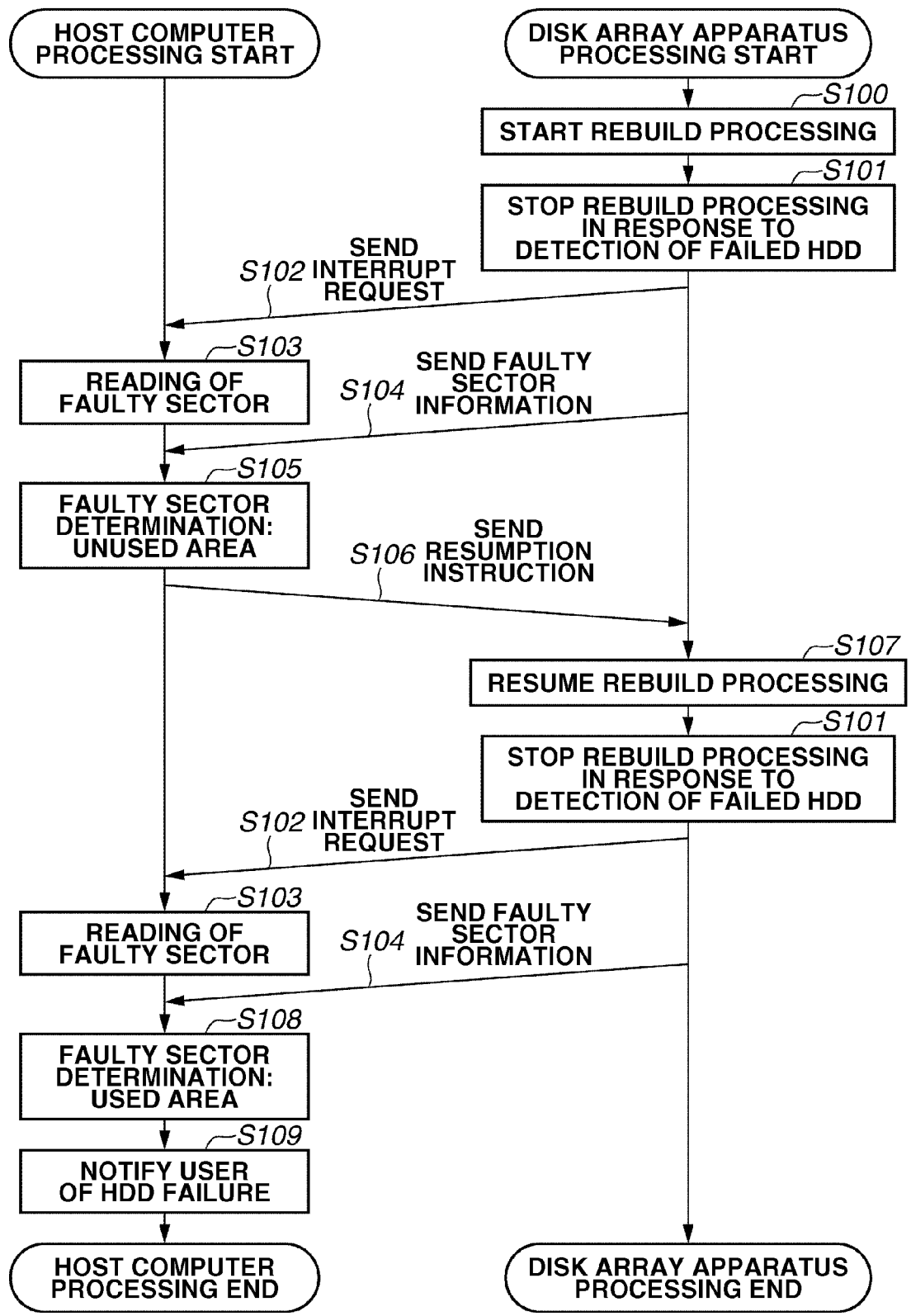
FIG. 2 illustrates a schematic flow of storage device array control processing that can be performed by the disk array system according to the first exemplary embodiment of the present invention.

FIG. 2 illustrates a schematic flow of storage device array control processing that can be performed by the disk array system 1000 according to the first exemplary embodiment. In the present exemplary embodiment, the RAID control unit 202 performs a control operation for the processing to be performed by the disk array apparatus 200. The processor 102 performs a control operation for the processing to be performed by the host computer 100.

In step S100, the disk array apparatus 200 starts rebuild processing when requisite conditions are satisfied. For example, if the disk array apparatus 200 detects a state that a failed HDD is replaced by a new HDD, the disk array apparatus 200 starts rebuild processing. Further, if the disk array apparatus 200 receives a rebuild instruction from the host computer 100, the disk array apparatus 200 starts rebuild processing. The conditions to be satisfied in step S100 may include any other condition.

The RAID control unit 202 in the disk array apparatus 200 can execute the rebuild processing. The rebuild processing is generally referred to as processing for restoring data stored in any one of storage devices (e.g., HDD 502) included in a plurality of RAID-configured storage devices from data stored in another storage device (HDDs 500 and 501). For example, when the HDD 500 and the HDD 501 are normal HDDs and the remaining HDD 502 is a new HDD replaced due to a failure, the disk array apparatus 200 performs the rebuild processing in the following manner if the RAID level is "5".

The RAID control unit 202 reads data from the HDDs 500 and 501 and performs an exclusive OR operation on the readout data. Then, the RAID control unit 202 writes an obtained result, as recovery data, into the HDD 502. Further, if the RAID level is "1", the RAID control unit 202 reads a data from a master HDD that is determined beforehand by the RAID control unit 202, among the normal HDDs 500 and 501, and writes the readout data, as recovery data, into the HDD 502.

Referring back to the flowchart illustrated in FIG. 2, if the RAID control unit 202 of the disk array apparatus 200 detects any failure occurring in a normal HDD during the rebuild processing, then in step S101, the RAID control unit 202 stops the rebuild processing. In step S102, the RAID control unit 202 sends an interrupt request to the host computer 100 via the interrupt transmission unit 204.

If the interrupt reception unit 103 of the host computer 100 receives the interrupt request from the interrupt transmission unit 204, then in step S103, the faulty sector reading unit 104 sends a faulty sector reading instruction to the disk array apparatus 200.

If the disk array apparatus 200 receives the faulty sector reading instruction from the host computer 100, then in step S104, the disk array apparatus 200 sends faulty sector information to the host computer 100. If in the host computer 100 the faulty sector reading unit 104 receives the faulty sector information from the disk array apparatus 200, then in step S105, the area determination unit 105 performs faulty sector determination based on the obtained faulty sector information and information relating to an unused area of the HDD from the file system functioning unit 101.

As a result of the faulty sector determination (in step S105), if the faulty sector is an unused area, then in step S106, the operation instructing unit 106 of the host computer 100 sends a rebuild processing resumption instruction to the disk array apparatus 200. If the disk array apparatus 200 receives the above-described notification, then in step S107, the RAID control unit 202 resumes the rebuild processing.

If the RAID control unit 202 detects any failure occurring in a normal HDD after resuming the rebuild processing, then in step S101, the RAID control unit 202 stops the rebuild processing. Further, in step S102, the RAID control unit 202 sends an interrupt request to the host computer 100 via the interrupt transmission unit 204.

As a result of the faulty sector determination (step S108), if the faulty sector is a used area, then in step S109, the processor 102 of the host computer 100 notifies a user of the failure having occurred in the HDD and prompts user to replace the failed HDD by a new HDD. For example, the processor 102 displays a message that notifies a user of information identifying the failed HDD on a display device (not illustrated) of the host computer 100 and prompts the user to replace the failed HDD by a new HDD.

Figure 3:
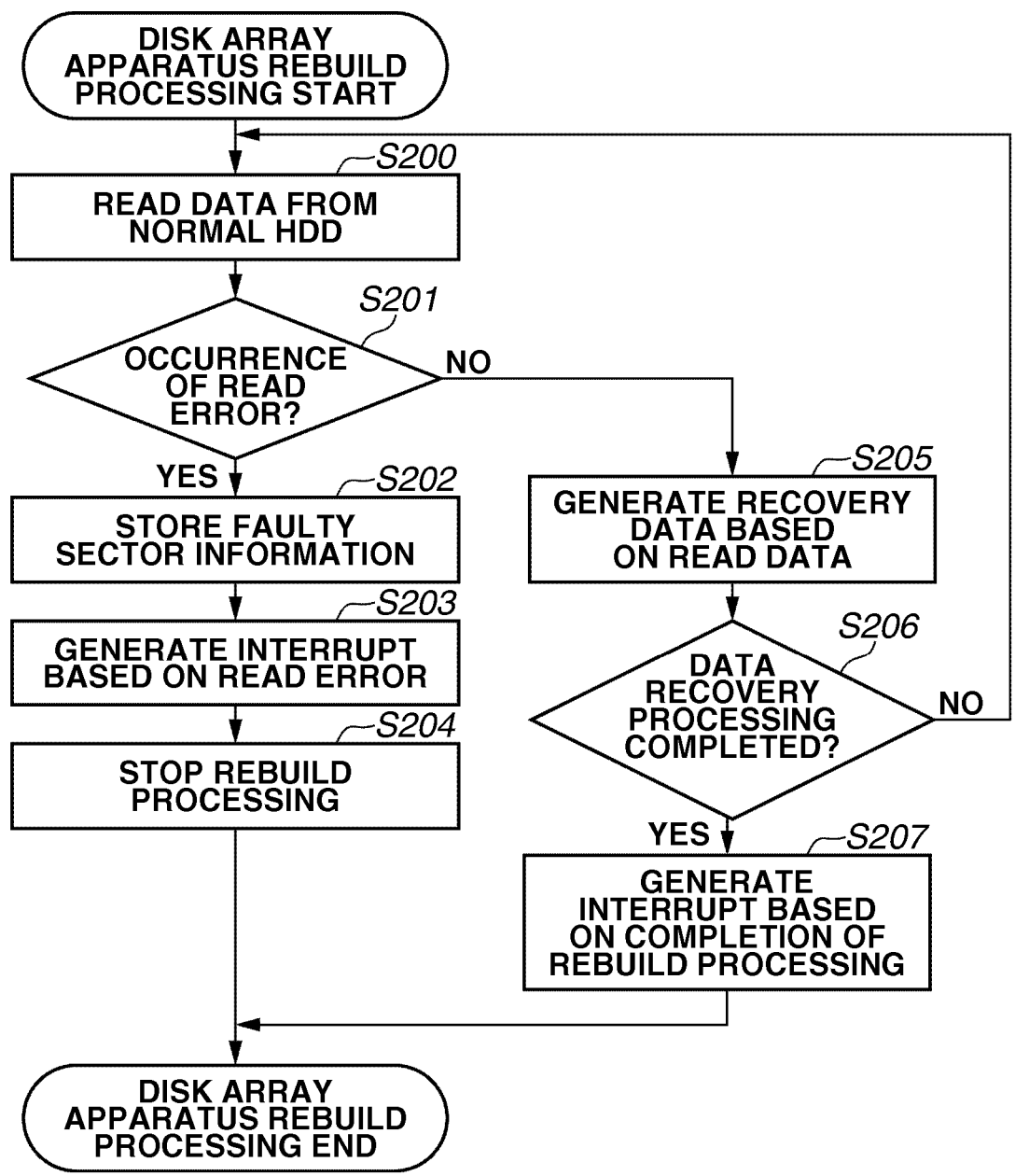
FIG. 3 is a flowchart illustrating an example of rebuild processing that can be performed by a disk array apparatus according to the first exemplary embodiment of the present invention.

FIG. 3 is a flowchart illustrating an example of the rebuild processing that can be performed by the disk array apparatus 200 according to the first exemplary embodiment. In the present exemplary embodiment, the RAID control unit 202 performs a control operation for the processing of the flowchart illustrated in FIG. 3. Further, it is presumed that the HDD 500 and the HDD 501 are normal HDDs and the remaining HDD 502 is a new HDD replaced due to a failure, although the present exemplary embodiment is not limited to a specific example.

Upon starting the rebuild processing, in step S200, the RAID control unit 202 reads data from the normal HDDs 500 and 501. Then, in step S201, the RAID control unit 202 confirms the presence of any error. If the occurrence of a read error is confirmed (detected) due to a failure occurring in the normal HDDs 500 and 501 (YES in step S201), then in step S202, the RAID control unit 202 identifies a faulty sector (i.e., an error occurrence place with respect to a rebuild read error). Then, the RAID control unit 202 causes the sector storing unit 203 to store information indicating the faulty sector. In this case, the RAID control unit 202 also stores ID information of the HDD 500 or the HDD 501 that has caused the read error, together with the faulty sector information, in the sector storing unit 203.

Then, in step S203, the RAID control unit 202 requests the interrupt transmission unit 204 to transmit an interrupt request to the host computer 100. The interrupt transmission unit 204 generates an interrupt signal based on the read error and transmits the generated interrupt signal to the host computer 100. In the processing in step S203, the interrupt transmission unit 204 stores, in its internal interrupt cause register, information indicating that the interrupt cause is the read error (rebuild read error) during the rebuild processing. Then, in step S204, the RAID control unit 202 stops the rebuild processing and terminates the processing of the flowchart illustrated in FIG. 3.

Subsequently, if an interrupt cause read command is received from the host computer 100, the RAID control unit 202 acquires the information indicating that the interrupt cause is the read error (rebuild read error) during the rebuild processing from the interrupt transmission unit 204 and transmits the acquired information to the host computer 100 (although the processing is not illustrated).

Figure 5:
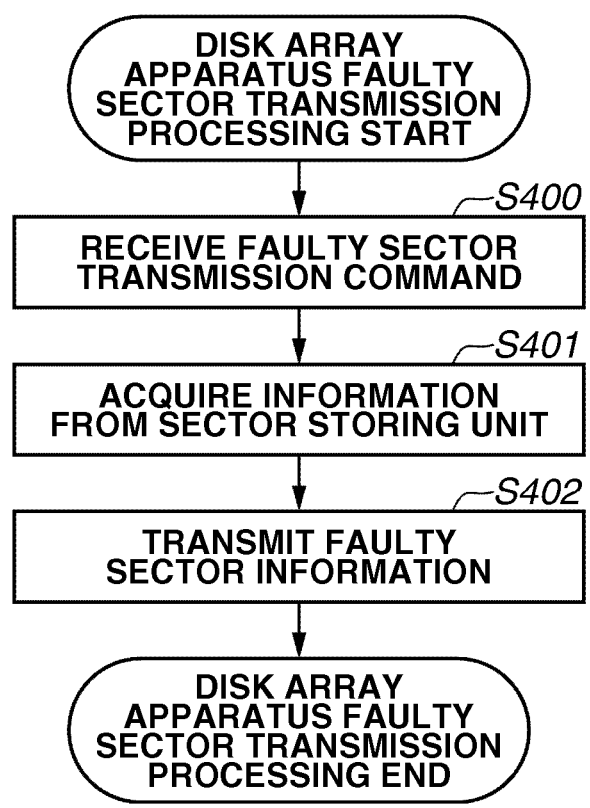
FIG. 5 is a flowchart illustrating an example of faulty sector information transmission processing that can be performed by the disk array apparatus according to the first exemplary embodiment of the present invention.

Further, if a faulty sector confirmation command is received from the host computer 100, the RAID control unit 202 transmits the faulty sector information stored in the sector storing unit 203 to the host computer 100 (i.e., processing illustrated in FIG. 5). Further, if a rebuild resumption instruction is received from the host computer 100, the RAID control unit 202 resumes the rebuild processing with a predetermined sector (e.g., a sector that follows the faulty sector) instructed by the rebuild resumption instruction.

On the other hand, if it is determined that there is not any read error having occurred (NO in step S201), then in step S205, the RAID control unit 202 generates recovery data based on the read data and writes the generated recovery data into the HDD 502.

Then, in step S206, the RAID control unit 202 confirms whether the data recovery processing has been completed for all areas. Then, if it is determined that an area that is not yet subjected to the data recovery processing is present (NO in step S206), the processing returns to step S200 and the RAID control unit 202 reads the next data.

On the other hand, if it is determined that all data has been recovered (YES in step S206), then in step S207, the RAID control unit 202 instructs the interrupt transmission unit 204 to transmit an interrupt request based on completion of the rebuild processing to the host computer 100. In response to the interrupt transmission instruction, the interrupt transmission unit 204 generates a rebuild processing completion interrupt signal and transmits the generated rebuild processing completion interrupt signal to the host computer 100.

Subsequently, the disk array apparatus 200 terminates the processing of the present flowchart illustrated in FIG. 3. If the interrupt cause read command is received from the host computer 100, the RAID control unit 202 transmits information indicating that the interrupt cause is the rebuild processing completion to the host computer 100 (although the processing is not illustrated).

If the RAID control unit 202 receives an interrupt cause clear command from the host computer 100, the RAID control unit 202 clears information indicating the interrupt cause stored in the interrupt cause register of the interrupt transmission unit 204 (although the processing is not illustrated).

Figure 4:
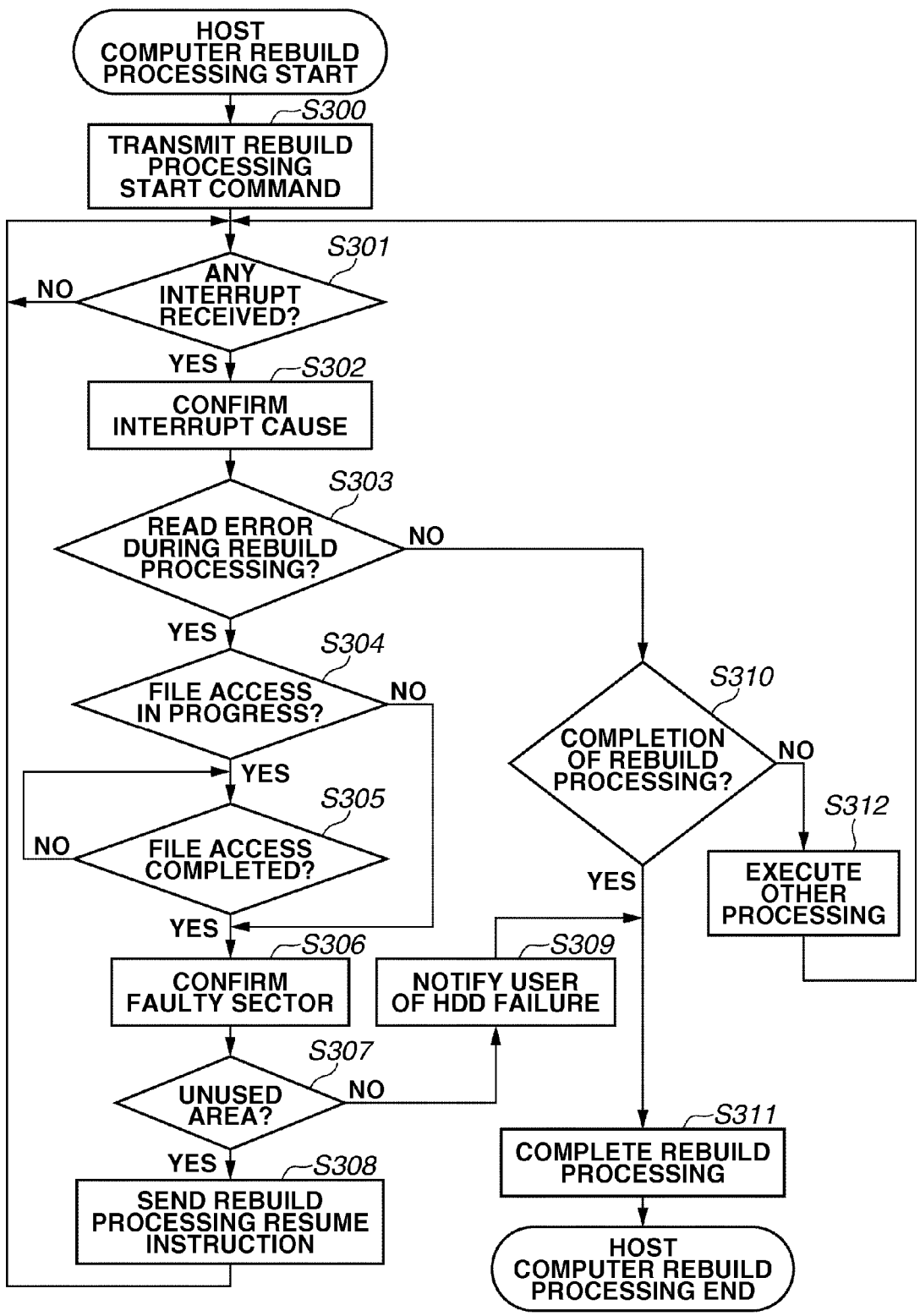
FIG. 4 is a flowchart illustrating an example of rebuild processing that can be performed by a host computer according to the first exemplary embodiment of the present invention.

FIG. 4 is a flowchart illustrating an example of the rebuild processing that can be performed by the host computer 100 according to the first exemplary embodiment. In the present exemplary embodiment, the processor 102 performs a control operation for the processing of the flowchart illustrated in FIG. 4. Further, it is presumed that the HDD 500 and the HDD 501 are normal HDDs and the remaining HDD 502 is a new HDD replaced due to a failure, although the present exemplary embodiment is not limited to a specific example.

In step S300, the processor 102 of the host computer 100 instructs the operation instructing unit 106 to transmit a rebuild processing start command to the disk array apparatus 200. The operation instructing unit 106 transmits the rebuild processing start command according to the instruction. In step S301, the host computer 100 determines whether an interrupt signal is received from the disk array apparatus 200. In the present exemplary embodiment, the disk array apparatus 200 starts the processing with step S301 if the rebuild processing starts in response to the detection of a newly connected HDD instead of a failed HDD.

If it is determined that the interrupt reception unit 103 has received an interrupt signal (YES in step S301), the processor 102 instructs the operation instructing unit 106 to transmit the interrupt cause read command. In response to the instruction, the operation instructing unit 106 transmits the interrupt cause read command to the disk array apparatus 200.

In step S302, the processor 102 confirms the interrupt cause based on information acquired from the disk array apparatus 200. In the present exemplary embodiment, after confirming the interrupt cause, in a non-illustrated step, the processor 102 instructs the operation instructing unit 106 to transmit the interrupt cause clear command. In response to the instruction, the operation instructing unit 106 transmits the interrupt cause clear command to the disk array apparatus 200.

Next, in step S303, the processor 102 determines whether the interrupt cause is a rebuild read error (i.e., a read error during the rebuild processing). If it is determined that the interrupt cause is a rebuild read error (YES in step S303), then in step S304, the processor 102 confirms whether the host computer 100 is currently accessing a file in any one of three HDDs 500, 501, and 502.

If it is determined that the host computer 100 is not currently accessing any file of the HDDs 500, 501, and 502 (NO in step S304), then in step S306, the processor 102 performs faulty sector confirmation processing. On the other hand, if it is determined that the host computer 100 is currently accessing a file in one of the HDDs 500, 501, and 502 (YES in step S304), then in step S305, the processor 102 determines whether the file access processing has been completed. If it is determined that the file access processing is already completed (YES in step S305), then in step S306, the processor 102 performs the faulty sector confirmation processing.

In the faulty sector confirmation processing to be performed in step S306, the processor 102 instructs the faulty sector reading unit 104 to confirm a faulty sector. In response to the instruction, the faulty sector reading unit 104 transmits a faulty sector read command to the disk array apparatus 200 and confirms a faulty sector based on faulty sector information acquired from the disk array apparatus 200. The faulty sector reading unit 104 transmits the faulty sector information to the area determination unit 105.

In the present exemplary embodiment, the faulty sector information includes ID information of a failed HDD (e.g., HDD 500 or HDD 501). Further, the processor 102 acquires information indicating an unused area of three HDDs 500, 501, and 502 from the file system functioning unit 101. The processor 102 transmits the information indicating the unused area to the area determination unit 105.

Next, in step S307, in response to the instruction from the processor 102 the area determination unit 105 confirms (determines) whether the faulty sector is a used area or an unused area based on the above-described acquired faulty sector information and unused area information. Then, the area determination unit 105 sends a confirmation result to the processor 102.

Then, if it is determined that the faulty sector is an unused area (YES in step S307), the processor 102 determines that the above-described error having been confirmed during the rebuild processing can be disregarded. More specifically, in this case, the processor 102 determines that the above-described error having been confirmed during the rebuild processing is an error that does not require interruption of the rebuild processing.

Then, in step S308, the processor 102 performs error skip control processing. More specifically, the processor 102 causes the operation instructing unit 106 to send a rebuild processing resumption instruction to the disk array apparatus 200. In the present exemplary embodiment, the processor 102 can instruct the disk array apparatus 200 to resume the rebuild processing from a sector that follows the faulty sector. Alternatively, the processor 102 can instruct the disk array apparatus 200 to resume the rebuild processing from a head sector of the next used area.

After completing the processing in step S308 (i.e., after sending the rebuild processing resumption instruction), the processing returns to step S301, in which the processor 102 again checks if an interrupt signal is received. If the RAID control unit 202 receives the rebuild processing resumption instruction, the RAID control unit 202 resumes the rebuild processing from a start sector that is included in the rebuild processing resumption instruction (e.g., a sector that follows the faulty sector or a head sector of the next used area).

More specifically, the RAID control unit 202 skips the faulty sector and resumes the rebuild processing. In the present exemplary embodiment, the host computer 100 designates the start sector of the rebuild processing. However, if the host computer 100 simply instructs resuming the rebuild processing, the RAID control unit 202 can (skip the faulty sector and) resume the rebuild processing from a sector that follows the faulty sector.

On the other hand, if it is determined that the faulty sector is a used area (NO in step S307), the processor 102 determines that the above-described error having been confirmed during the rebuild processing cannot be disregarded. Namely, the processor 102 recognizes the error. More specifically, in this case, the processor 102 determines that the rebuild processing cannot be continued due to the above-described error having been confirmed during the rebuild processing.

Then, in step S309, the processor 102 notifies a user of the occurrence of an HDD failure. For example, the host computer 100 displays a message notifying a user of information identifying the failed HDD on a display device (not illustrated) and prompts the user to replace the failed HDD by a new HDD. Then, in step S311, the processor 102 completes the rebuild processing to be performed by the disk array system 1000 and terminates the processing of the flowchart illustrated in FIG. 4.

If it is determined that the interrupt cause is not a read error during the rebuild processing (NO in step S303), then in step S310, the processor 102 determines whether the interrupt cause is the rebuild processing completion. If it is determined that the interrupt cause is the rebuild processing completion (YES in step S310), then in step S311, the processor 102 completes the rebuild processing to be performed by the disk array system 1000 and terminates the processing of the flowchart illustrated in FIG. 4.

On the other hand, if it is determined that the interrupt cause is not the rebuild processing completion (NO in step S310), then in step S312, the processor 102 executes other processing according to the interrupt cause. Subsequently, the processing returns to step S301 in which the processor 102 again checks if an interrupt signal is received.

FIG. 5 is a flowchart illustrating an example of faulty sector information transmission processing that can be performed by the disk array apparatus 200 according to the first exemplary embodiment. In the present exemplary embodiment, the RAID control unit 202 performs a control operation for the processing of the flowchart illustrated in FIG. 5. Further, it is presumed that the HDD 500 and the HDD 501 are normal HDDs and the remaining HDD 502 is a new HDD replaced due to a failure, although the present exemplary embodiment is not limited to a specific example.

In step S400, if the SATA device control unit 201 receives a faulty sector transmission command from the host computer 100, the SATA device control unit 201 transmits information relating to the received command to the RAID control unit 202. Then, the RAID control unit 202 receives the faulty sector transmission command.

In step S401, the RAID control unit 202 starts processing according to the received faulty sector transmission command and reads the faulty sector information stored in the sector storing unit 203. Next, the RAID control unit 202 generates faulty sector information to be transmitted (i.e., the data according to a faulty sector information format illustrated in FIG. 8) based on the above-described faulty sector information having been read. Then, the RAID control unit 202 sends the generated faulty sector information to the SATA device control unit 201. In step S402, the SATA device control unit 201 transmits the received faulty sector information to the host computer 100.

FIG. 6 illustrates an example format usable for a control command 600 to be used in the disk array system 1000 according to the first exemplary embodiment. The control command 600 illustrated in FIG. 6 corresponds to the disk array apparatus 200. The disk array apparatus 200 according to the first exemplary embodiment uses the control command 600 having a command format regulated according to the ATA.

The control command 600 includes a Features field 601, into which a corresponding control ID can be inserted (described). The disk array system 1000 according to the first exemplary embodiment allocates "0x00" to an interrupt enable command and "0x01" to the interrupt cause read command. Further, the disk array system 1000 allocates "0x02" to the interrupt cause clear command and "0x10" to the faulty sector read command. Further, the disk array system 1000 allocates "0x11" to a faulty sector clear command and "0x20" to the rebuild processing start command. Moreover, the disk array system 1000 allocates "0x21" to a rebuild processing stop command and "0x22" to a rebuild processing resume command.

The control command 600 further includes a Command field 602, into which a command regulated according to the ATA can be inserted (described). The disk array system 1000 according to the first exemplary embodiment uses "0xFF" that is regulated as a vendor definition command. The control command 600 further includes a C/I/D field 603 that can be used to instruct a soft reset control or the like.

The control command 600 further includes a FIS Type field 604 that designates a frame structure that is referred to as "Frame Information Structure." The disk array system 1000 according to the first exemplary embodiment uses "0x27" that is regulated as a Host-to-Device Register type.

The control command 600 further includes a Dev/Head field 605, into which an HDD head number, a master/slave device, and an LBA/CHS switching instruction can be inserted (described). The control command 600 further includes a Cyl High field 606, into which a host HDD cylinder number can be inserted (described). The control command 600 further includes a Cyl Low field 607, into which a subordinate HDD cylinder number can be inserted (described).

The control command 600 further includes a Sec Num field 608, into which an HDD sector number can be inserted (described). The control command 600 further includes a Features(exp) field 609 that can be used as an extended field of the Features field 601. The control command 600 further includes a Cyl High(exp) field 610, to which a host LBA corresponding to an HDD whose capacity exceeds 137 GBytes can be allocated.

The control command 600 further includes a Cyl Low(exp) field 611, to which a subordinate LBA corresponding to an HDD whose capacity exceeds 137 GBytes can be allocated. The control command 600 further includes a Sec Num(exp) field 612, into which a sector number of an HDD whose capacity exceeds 137 gigabytes can be inserted (described). The control command 600 further includes a Control field 613 that can be used for an HDD control.

The control command 600 further includes a Sec Cnt(exp) field 614, into which the number of continuously processed sectors that correspond to an HDD whose capacity exceeds 137 gigabytes can be inserted (described). The control command 600 further includes a Sec Cnt field 615, into which the number of continuously processed sectors can be inserted (described). The control command 600 further includes a Reserved field 616 that is reserved for future use (e.g., in a case of functional expansion) and is presently not used.

FIG. 7 illustrates an example format usable for interrupt cause information that can be transmitted from the disk array apparatus 200 to the host computer 100. The interrupt cause information illustrated in FIG. 7 includes an address field 700 allocated to 4-byte data representing addresses 0x000 to 0x003 and a content field 701 allocated to information indicating an interrupt cause. Further, the interrupt cause information illustrated in FIG. 7 includes an address field 702 allocated to 508-byte data representing addresses 0x004 to 0x1FF and a content field 703 allocated to "Reserved."

Further, although not illustrated, information allocated to Bit 0 of the interrupt cause (addresses 0x000 to 0x003) is rebuild processing read error. If a setting value of Bit 0 is "1", it indicates that the interrupt cause is the rebuild processing read error. Further, information allocated to Bit 1 is rebuild processing write error. If a setting value of Bit 1 is "1", it indicates that the interrupt cause is the rebuild processing write error.

Further, information allocated to Bit 2 is rebuild processing completion. If a setting value of Bit 2 is "1", it indicates that the interrupt cause is completion of the rebuild processing. Further, information allocated to Bit 8 is HDD (channel A) connection detection. If a setting value of Bit 8 is "1", it indicates that the interrupt cause is the HDD (channel A) connection detection. Further, information allocated to Bit 9 is HDD (channel A) disconnection detection. If a setting value of Bit 9 is "1", it indicates that the interrupt cause is the HDD (channel A) disconnection detection.

Further, information allocated to Bit 16 is HDD (channel B) connection detection. If a setting value of Bit 16 is "1", it indicates that the interrupt cause is the HDD (channel B)

connection detection. Further, information allocated to Bit 17 is HDD (channel B) disconnection detection. If a setting value of Bit 17 is "1", it indicates that the interrupt cause is the HDD (channel B) disconnection detection.

Further, information allocated to Bit 24 is HDD (channel C) connection detection. If a setting value of Bit 24 is "1", it indicates that the interrupt cause is the HDD (channel C) connection detection. Further, information allocated to Bit 25 is HDD (channel C) disconnection detection. If a setting value of Bit 25 is "1", it indicates that the interrupt cause is the HDD (channel C) disconnection detection.

In the disk array apparatus 200, if the RAID control unit 202 detects an event, the RAID control unit 202 instructs the interrupt transmission unit 204 to transmit an interrupt request corresponding to the detected event. The interrupt transmission unit 204 includes an interrupt enable register and the interrupt cause register. If the RAID control unit 202 receives an interrupt enable command from the host computer 100, the RAID control unit 202 instructs the interrupt transmission unit 204 to perform interrupt enable setting.

The interrupt transmission unit 204 sets a corresponding Bit of the interrupt enable register to "1" according to an instruction from the RAID control unit 202. Thus, when the interrupt transmission unit 204 receives an interrupt request from the RAID control unit 202, the interrupt transmission unit 204 does not process the interrupt request if a value "1" is set to the Bit of the enable register corresponding to the interrupt.

On the other hand, if the value "1" is not set to the Bit of the enable register corresponding to the interrupt, the interrupt transmission unit 204 sets a value "1" to the Bit of the interrupt cause register that corresponds to the interrupt request from the RAID control unit 202. Then, the interrupt transmission unit 204 transmits an interrupt signal to the host computer 100 via the interrupt signal line 300.

Further, if the RAID control unit 202 receives the interrupt cause read command, the interrupt transmission unit 204 reads a value from the interrupt cause register and generates information indicating the interrupt cause according to the format illustrated in FIG. 7 based on the read value. Then, the interrupt transmission unit 204 transmits the generated information indicating the interrupt cause to the host computer 100.

Further, if the RAID control unit 202 receives the interrupt cause clear command, the RAID control unit 202 instructs the interrupt transmission unit 204 to clear the interrupt cause. The interrupt transmission unit 204 clears the interrupt cause with respect to the Bit of the interrupt cause register whose value is set to "1" according to an instruction from the RAID control unit 202.

FIG. 8 illustrates an example format usable for the faulty sector information that can be transmitted from the disk array apparatus 200 to the host computer 100. The faulty sector information illustrated in FIG. 8 includes an address field 710 allocated to 4-byte data representing addresses 0x000 to 0x003 and a content field 711 allocated to information indicating lower 28-bit information of faulty sector. The faulty sector information illustrated in FIG. 8 further includes an address field 712 allocated to 4-byte data representing addresses 0x004 to 0x007 and a content field 713 allocated to information indicating upper 20-bit information of faulty sector.

Further, the faulty sector information illustrated in FIG. 8 includes an address field 714 allocated to 4-byte data representing addresses 0x008 to 0x00B and a content field 715 allocated to ID information of faulty sector detected HDD. Further, the faulty sector information illustrated in FIG. 8 includes an address field 716 allocated to 4-byte data representing addresses 0x00C to 0x00F and a content field 717 allocated to connection channel information of faulty sector detected HDD.

Further, the faulty sector information illustrated in FIG. 8 includes an address field 718 allocated to 496-byte data representing addresses 0x010 to 0x1FF and a content field 719 allocated to "Reserved."

If the RAID control unit 202 detects a faulty sector during its operation, the RAID control unit 202 divides 48-bit information of the detected faulty sector into upper 20-bit data and lower 28-bit data. Then, the RAID control unit 202 inserts the lower 20-bit data into the content field 711 designated by the addresses 0x000 to 0x003. The RAID control unit 202 inserts the upper 20-bit data into the content field 713 designated by the addresses 0x004 to 0x007.

Further, the RAID control unit 202 inserts ID information of the faulty sector detected HDD to the content field 715 designated by the addresses 0x008 to 0x00B. In addition, the RAID control unit 202 inserts channel information of the faulty sector detected HDD to the content field 717 designated by the addresses 0x00C to 0x00F. Then, the RAID control unit 202 transmits the generated faulty sector information to the host computer 100.

FIG. 9 illustrates an example format usable for rebuild processing start sector information and rebuild processing end sector information that can be transmitted from the host computer to the disk array apparatus 200. In the present exemplary embodiment, the rebuild processing start sector information corresponds to information indicating a sector whose rebuild processing should be resumed. The rebuild processing end sector information corresponds to information indicating a sector whose rebuild processing should be terminated.

The rebuild processing start/end sector information illustrated in FIG. 9 includes an address field 720 allocated to 4-byte data representing addresses 0x000 to 0x003 and a content field 721 allocated to lower 28-bit information of rebuild processing start sector. The rebuild processing start/end sector information further includes an address field 722 allocated to 4-byte data representing addresses 0x004 to 0x007 and a content field 723 allocated to upper 20-bit information of rebuild processing start sector.

Further, the rebuild processing start/end sector information includes an address field 724 allocated to 4-byte data representing addresses 0x008 to 0x00B and a content field 725 allocated to lower 28-bit information of rebuild processing end sector. Further, the rebuild processing start/end sector information includes an address field 726 allocated to 4-byte data representing addresses 0x00C to 0x00F and a content field 727 allocated to upper 20-bit information of rebuild processing end sector.

Further, the rebuild processing start/end sector information includes an address field 728 allocated to 496-byte data representing addresses 0x010 to 0x1FF and a content field 729 allocated to "Reserved." If the faulty sector is an unused area, the processor 102 causes the operation instructing unit 106 to transmit the rebuild processing start sector information and the rebuild processing end sector information illustrated in FIG. 9, in addition to the rebuild processing resume command, to the disk array apparatus 200.

The RAID control unit 202 of the disk array apparatus 200 resumes the rebuild processing from the rebuild processing start sector according to the received rebuild processing resume command and terminates the rebuild processing at the rebuild processing end sector.

In the present exemplary embodiment, the disk array system 1000 executes the rebuild processing throughout the entire area of each of the HDDs 500 and 501. Alternatively, the disk array system 1000 can execute the rebuild processing within a limited used area according to management information of the file system functioning unit 101.

Figure 10:
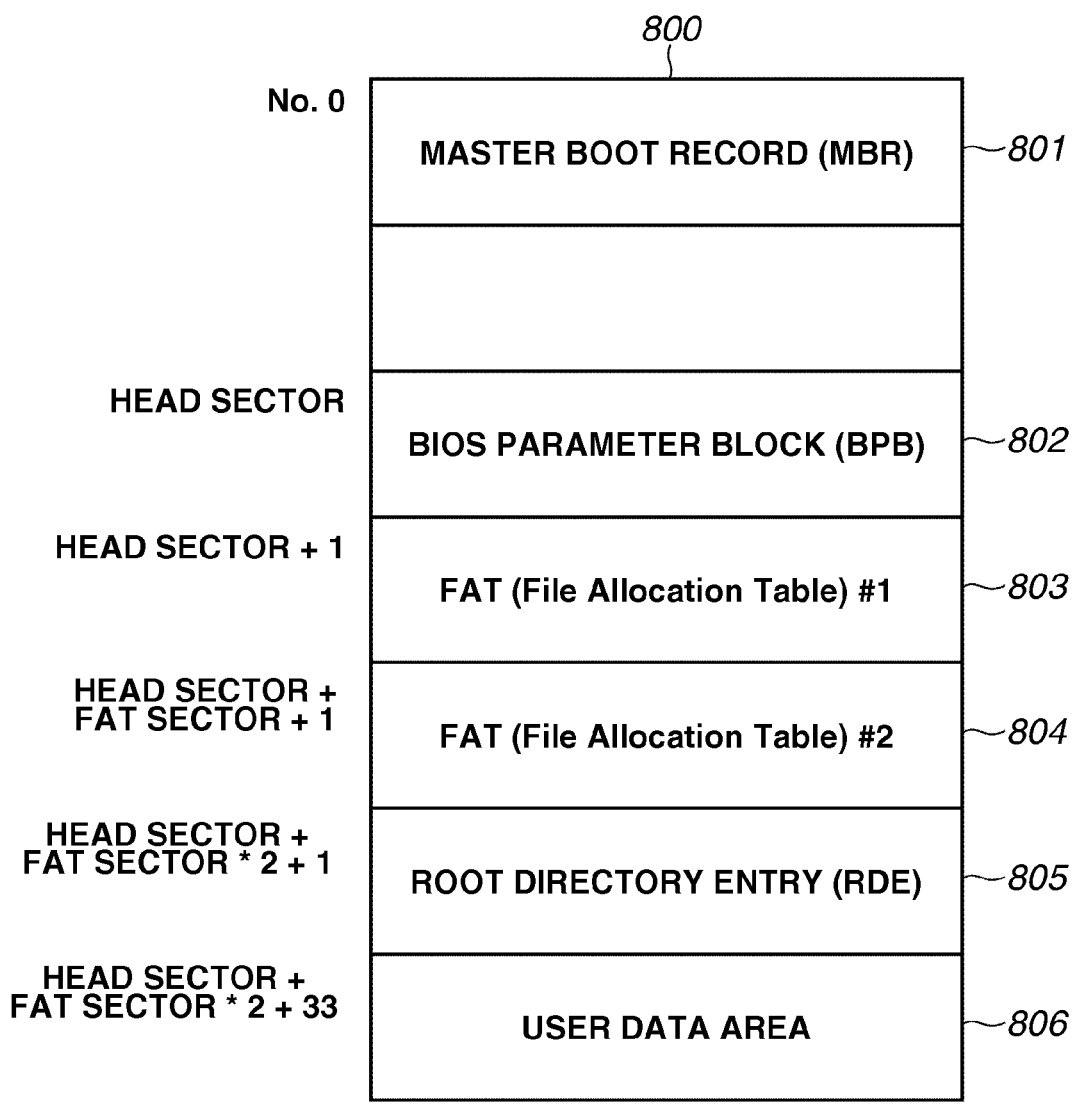
FIG. 10 illustrates an example format usable for a file system that can be used by the disk array system according to the first exemplary embodiment of the present invention.

FIG. 10 illustrates an example format usable for a file system 800 that can be used by the disk array system 1000. The file system 800 illustrated in FIG. 10 is based on FAT16 as an example of the file system that can be used by the file system functioning unit 101. The file system 800 includes a field allocated to a master boot record 801, which is 512-byte data stored in a sector corresponding to sector No. 0 of respective HDDs 500, 501, and 502. The master boot record 801 includes information indicating bootability of the device that holds the master boot record 801. Further, the master boot record 801 includes FAT type and head sector.

The file system 800 includes a BIOS parameter block 802, which is 512-byte data stored in a sector corresponding to the sector number stored in a head sector field of the master boot record 801. The BIOS parameter block 802 includes parameter information of partition, total number of bytes per sector, total number of sectors per cluster, and total number of sectors per FAT.

The file system 800 includes a File Allocation Table (FAT) 803 held at sector No. [head sector+1] and a File Allocation Table (FAT) 804 held at sector No. [head sector+FAT sector+1]. The FAT sector, which represents the size of each FAT, is stored in the master boot record 801. FATs 803 and 804 are tables usable to manage file layout information in the disk.

According to the FAT16, the file access processing is performed on a sector-by-sector basis. In a case where a physical sector on the disk is allocated to each file, the allocation is performed on a cluster-by-cluster basis. The cluster is an assembly of sectors and can be referred to as a block.

The file is constituted by a plurality of clusters. However, the physical positions of respective clusters on the disk are not always continuous. The FATs 803 and 804 can be used to identify the order of clusters and manage the clusters constituting the same file. Each entry of the FATs 803 and 804 corresponds to each cluster of the disk in a one-to-one manner and represents the usage status of a corresponding cluster. Accordingly, determining whether each cluster (assembly of sectors) is used or unused becomes feasible by referring to the FATs 803 and 804.

The file system 800 includes a root directory entry 805, which is held at sector No. [head sector+FAT sector×2+1]. For example, file name, file attribute, creation time information, head cluster number, and file size can be stored in the root directory entry 805.

The file system 800 includes a user data area 806, which is held at sector No. [head sector+FAT sector×2+33]. The user data area 806 stores actual data. The disk array system 1000 according to the first exemplary embodiment of the present invention determines whether the faulty sector is a used area or an unused area with reference to the FATs 803 and 804. In the present exemplary embodiment, the file system functioning unit 101 uses the FAT16 as an example of the file system. However, the disk array system 1000 according to the present exemplary embodiment does not restrict the type of the OS to be used. Therefore, other FAT 32 and UNIX® file system are also usable.

In the above-described first exemplary embodiment, the host computer confirms if any read error occurs in the disk array apparatus in response to reception of an interrupt from the disk array apparatus. In a second exemplary embodiment of the present invention, the host computer performs a polling-based operation to confirm an occurrence of any read error in the disk array apparatus.

Figure 11:
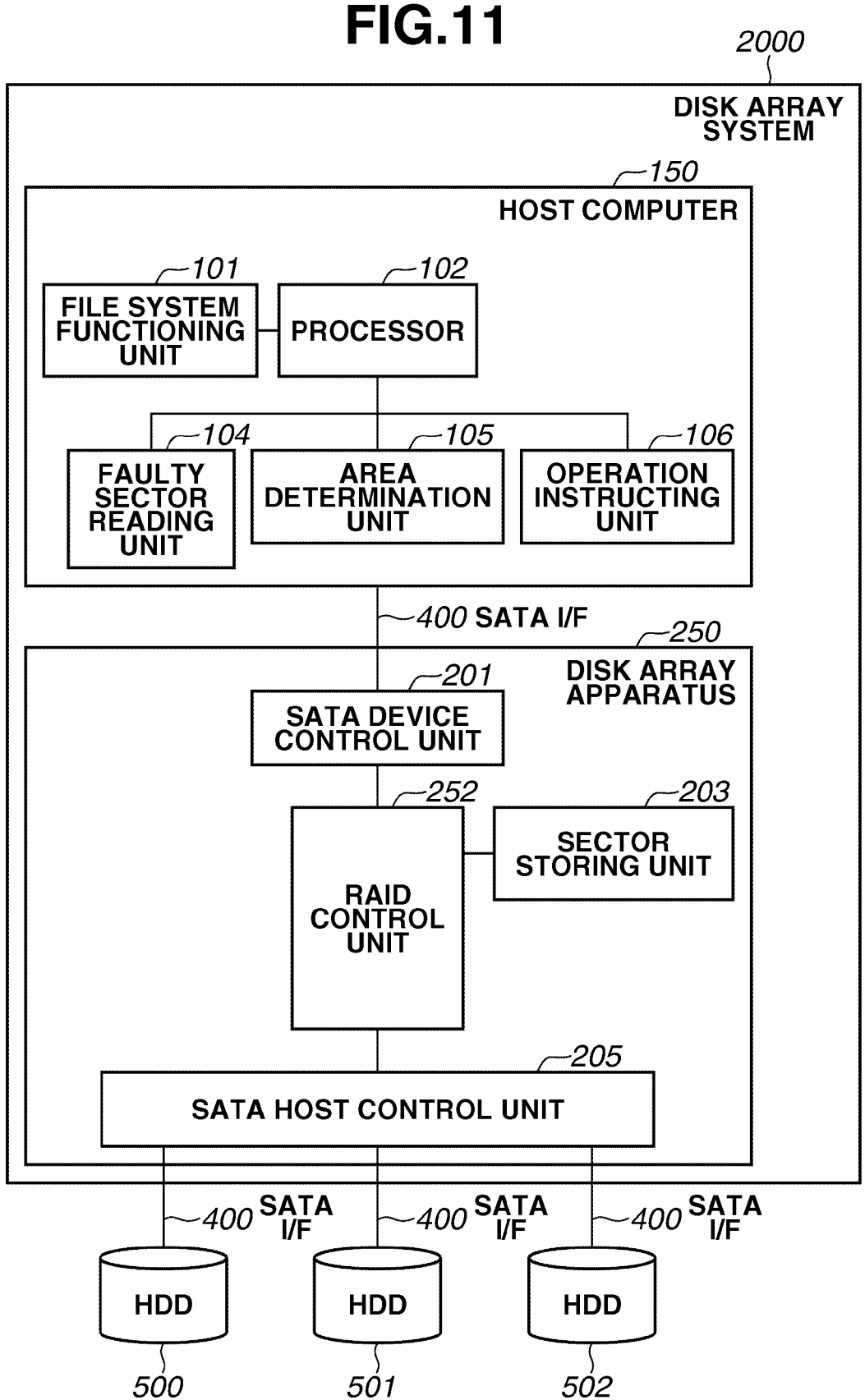
FIG. 11 illustrates a configuration of a disk array system according to a second exemplary embodiment of the present invention.

FIG. 11 illustrates a configuration of a disk array system 2000 according to the second exemplary embodiment of the present invention. In FIG. 11, components similar to those illustrated in FIG. 1 are denoted by the same reference numerals. The disk array system 2000 according to the second exemplary embodiment is a modified example of the disk array system 1000 illustrated in FIG. 1. The configuration of the disk array system 2000 is substantially similar to that of the disk array system 1000 described in the first exemplary embodiment, except for the following configuration.

The disk array system 2000 is different from the disk array system 1000 in that no interrupt connection is provided between a host computer 150 and a disk array apparatus 250.

The host computer 150 includes a file system functioning unit 101, a processor 102, a faulty sector reading unit 104, an area determination unit 105, and an operation instructing unit 106. In response to an instruction from the processor 102, the operation instructing unit 106 periodically transmits an inquiry to the disk array apparatus 250. Namely, the operation instructing unit 106 transmits the interrupt cause read command and acquires, from the disk array apparatus 250, information indicating a faulty sector in which a rebuild error has occurred.

The disk array apparatus 250 includes an SATA device control unit 201, a RAID control unit 252, a sector storing unit 203, and an SATA host control unit 205. As a modified exemplary embodiment, the sector storing unit 203 can be integrated together with the RAID control unit 252.

In the present exemplary embodiment, the RAID control unit 252 includes an internal interrupt cause storage unit (e.g., a register or a memory). The internal interrupt cause storage unit stores interrupt causes (rebuild processing read error cause, rebuild processing completion cause, etc.) that have occurred in the disk array apparatus 250. If the RAID control unit 252 receives the interrupt cause read command (the above-described inquiry) from the host computer 150, the RAID control unit 252 acquires interrupt cause information from its internal interrupt cause storage unit and transmits the acquired interrupt cause information to the host computer 150.

In the present exemplary embodiment, it is presumed that the interrupt cause read command is substantially similar to the interrupt cause read command described in the first exemplary embodiment. Further, it is presumed that the format of the interrupt cause to be transmitted to the host computer 150 is similar to the format of the interrupt cause described in the first exemplary embodiment.

Further, if the RAID control unit 252 receives the interrupt cause clear command from the host computer 150, the RAID control unit 252 deletes the interrupt cause information stored in the internal interrupt cause storage unit. Further, if the RAID control unit 252 receives the faulty sector confirmation command from the host computer 150, the RAID control unit 252 transmits the faulty sector information stored in the sector storing unit 203 to the host computer 150.

Figure 12:
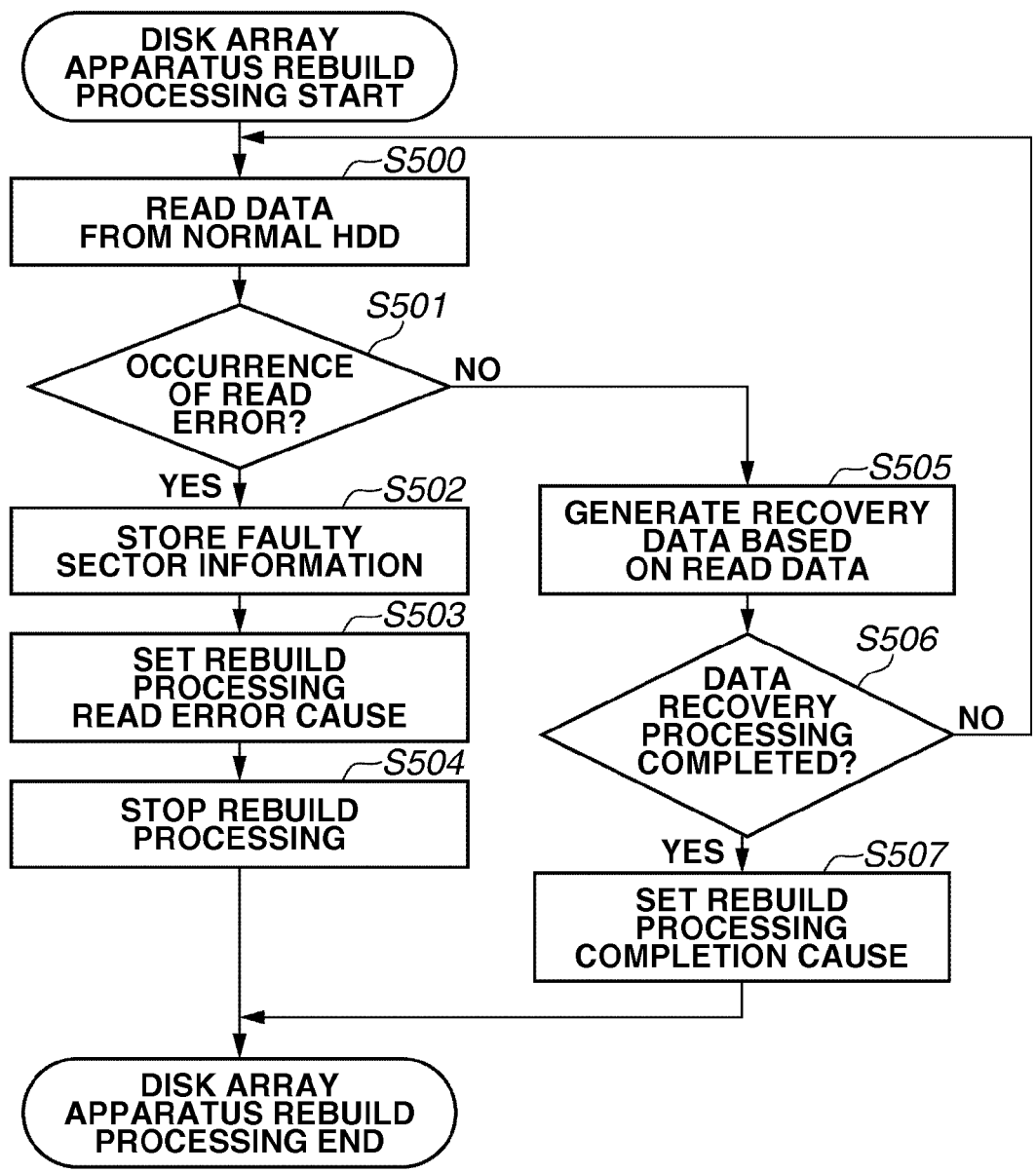
FIG. 12 is a flowchart illustrating an example of rebuild processing that can be performed by a disk array apparatus according to the second exemplary embodiment of the present invention.

FIG. 12 is a flowchart illustrating an example of the rebuild processing that can be performed by the disk array apparatus 250 according to the second exemplary embodiment. In the present exemplary embodiment, the RAID control unit 252 performs a control operation for the processing of the flowchart illustrated in FIG. 12. Further, it is presumed that the HDD 500 and the HDD 501 are normal HDDs and the remaining HDD 502 is a new HDD replaced due to a failure, although the present exemplary embodiment is not limited to a specific example.

Upon starting the rebuild processing, in step S500, the RAID control unit 252 reads data from the normal HDDs 500 and 501. Then, in step S501, the RAID control unit 252 confirms the presence of any error. If the occurrence of a read error is confirmed (detected) (YES in step S501), then in step S502, the RAID control unit 252 identifies a faulty sector. Then, the RAID control unit 252 causes the sector storing unit 203 to store information indicating the faulty sector. In this case, the RAID control unit 252 also stores ID information of the HDD 500 or the HDD 501 that has caused the read error, together with the faulty sector information, in the sector storing unit 203.

Then, in step S503, the RAID control unit 252 sets a rebuild processing read error cause (information indicating a read error having occurred during the rebuild processing) in the internal interrupt cause storage unit of the RAID control unit 252. Then, in step S504, the RAID control unit 252 stops the rebuild processing and terminates the processing of the flowchart illustrated in FIG. 12.

Subsequently, if the RAID control unit 252 receives the interrupt cause read command from the host computer 150, the RAID control unit 252 acquires the interrupt cause (i.e., the rebuild processing read error cause) from its internal interrupt cause storage unit and transmits the acquired interrupt cause to the host computer 150 (although the processing is not illustrated).

Further, if the RAID control unit 252 receives the faulty sector confirmation command from the host computer 150, the RAID control unit 252 transmits the faulty sector information stored in the sector storing unit 203 to the host computer 150. Further, if the RAID control unit 252 receives the rebuild resumption instruction from the host computer 100, the RAID control unit 252 resumes the rebuild processing from a sector instructed by the rebuild resumption instruction (e.g., a sector that follows the faulty sector).

On the other hand, if it is determined that there is not any read error having occurred (NO in step S501), then in step S505, the RAID control unit 252 generates recovery data based on the read data and writes the generated recovery data into the HDD 502.

Then, in step S506, the RAID control unit 252 confirms whether the data recovery processing has been completed for all areas. Then, if it is determined that an area that is not yet subjected to the data recovery processing is present (NO in step S506), the processing returns to step S500, in which the RAID control unit 252 reads the next data.

On the other hand, if it is determined that all data has been recovered (YES in step S506), then in step S507, the RAID control unit 252 sets a rebuild processing completion cause (information indicating completion of the rebuild processing) in an internal memory of the RAID control unit 252. Then, the RAID control unit 252 terminates the processing of the flowchart illustrated in FIG. 12. Subsequently, if the RAID control unit 252 receives the interrupt cause read command from the host computer 150, the RAID control unit 252 acquires the interrupt cause (i.e., the rebuild processing completion cause) from its internal interrupt cause storage unit and transmits the acquired interrupt cause to the host computer 150 (although the processing is not illustrated).

Figure 13:
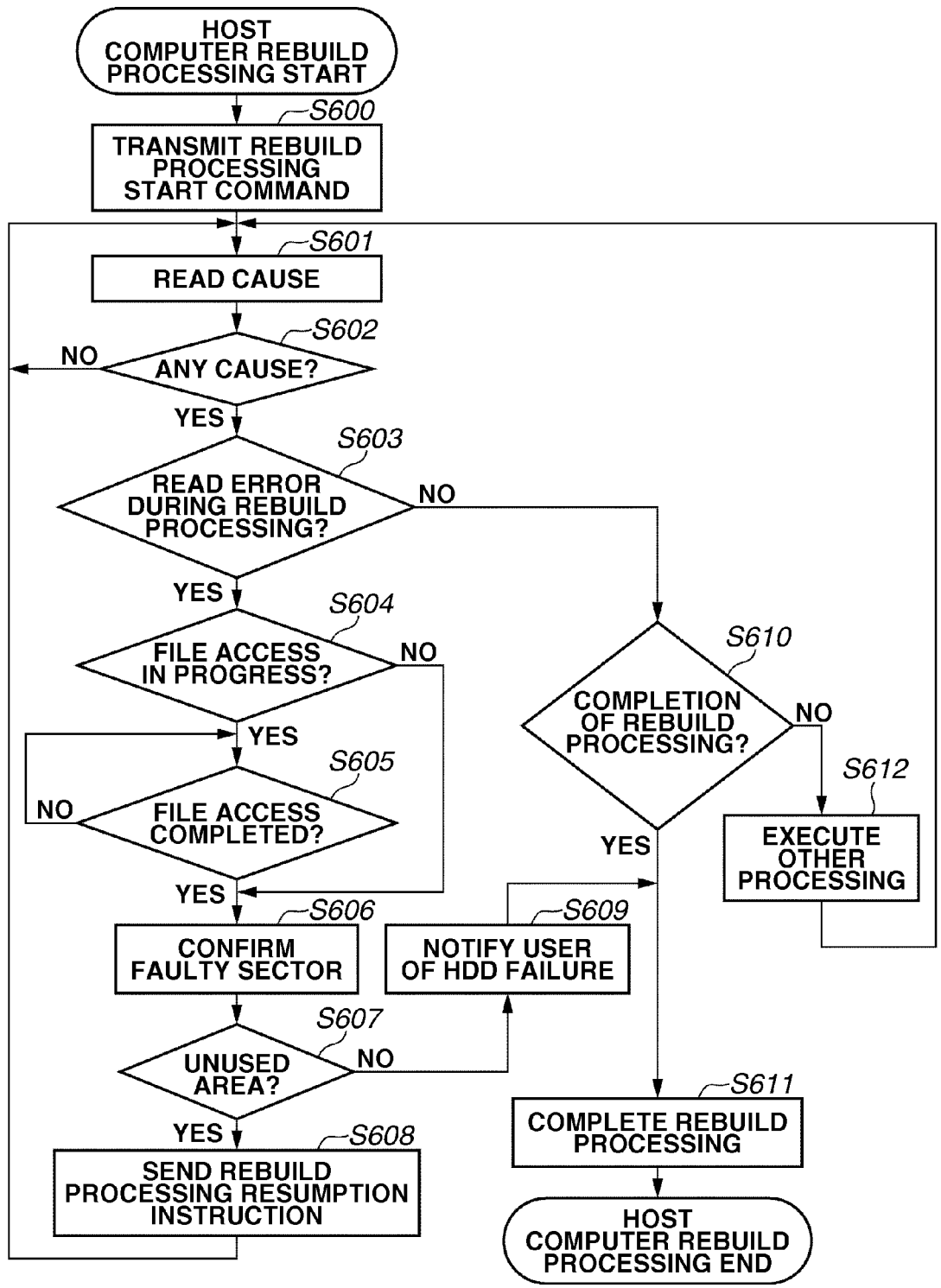
FIG. 13 is a flowchart illustrating an example of rebuild processing that can be performed by a host computer according to the second exemplary embodiment of the present invention.

FIG. 13 is a flowchart illustrating an example of the rebuild processing that can be performed by the host computer 150 according to the second exemplary embodiment. In the present exemplary embodiment, the processor 102 performs a control operation for the processing of the flowchart illustrated in FIG. 13. Further, it is presumed that the HDD 500 and the HDD 501 are normal HDDs and the remaining HDD 502 is a new HDD replaced due to a failure, although the present exemplary embodiment is not limited to a specific example.

In step S600, the processor 102 of the host computer 150 instructs the operation instructing unit 106 to transmit the rebuild processing start command to the disk array apparatus 250. The operation instructing unit 106 transmits the rebuild processing start command according to the instruction.

In step S601, the processor 102 instructs the operation instructing unit 106 to transmit the interrupt cause read command to the disk array apparatus 250. The operation instructing unit 106 sends the interrupt cause read command according to the instruction. In the present exemplary embodiment, in a case where the disk array apparatus 250 starts the rebuild processing in response to a replacement from a failed HDD to a new HDD, it is presumed that the processor 102 starts the processing of step S601.

In step S602, the processor 102 reads the interrupt cause acquired from the disk array apparatus 250 and determines whether there is any interrupt cause having been set. If it is determined that there is not any interrupt cause having been set (NO in step S602), the processing returns to step S601 and sends the interrupt cause read command again to the disk array apparatus 250. In the present exemplary embodiment, the host computer 150 sends the interrupt cause read command at optimum intervals (e.g., 1 [s] or 100 [ms]) which can be set by the disk array system 2000.

On the other hand, if it is determined that an interrupt cause is present (YES in step S602), then in step S603, the processor 102 determines whether the interrupt cause is an error caused during the rebuild processing. Then, if it is determined that the interrupt cause is the error caused during the rebuild processing (YES in step S603), then in step S604, the processor 102 confirms whether the host computer 150 is currently accessing a file in one of three HDDs 500, 501, and 502.

If it is determined that the host computer 150 is not currently accessing any file of the HDDs 500, 501, and 502 (NO in step S604), then in step S606, the processor 102 performs faulty sector confirmation processing. On the other hand, if it is determined that the host computer 150 is currently accessing a file in one of the HDDs 500, 501, and 502 (YES in step S604), then in step S605, the processor 102 determines whether the file access processing has been completed. If it is determined that the file access processing is already completed (YES in step S605), then in step S606, the processor 102 performs the faulty sector confirmation processing.

In the faulty sector confirmation processing to be performed in step S606, the processor 102 instructs the faulty sector reading unit 104 to confirm a faulty sector. In response to the instruction, the faulty sector reading unit 104 transmits the faulty sector read command to the disk array apparatus 250 and acquires the faulty sector information from the disk array apparatus 250. The faulty sector reading unit 104 confirms the faulty sector based on the acquired information.

The faulty sector reading unit 104 transmits the faulty sector information to the area determination unit 105. In the present exemplary embodiment, the faulty sector information includes ID information of a failed HDD (e.g., HDD 500 or the HDD 501). Further, the processor 102 acquires information indicating an unused area of three HDDs 500, 501, and 502 from the file system functioning unit 101. The processor 102 transmits the information indicating the unused area to the area determination unit 105.

Next, in step S607, in response to the instruction from the processor 102 the area determination unit 105 confirms (determines) whether the faulty sector is a used area or an unused area based on the above-described acquired faulty sector information and unused area information. Then, the area determination unit 105 sends a confirmation result to the processor 102.

Then, if it is determined that the faulty sector is an unused area (YES in step S607), the processor 102 determines that the above-described error having been confirmed during the rebuild processing can be disregarded. More specifically, in this case, the processor 102 determines that the above-described error having been confirmed during the rebuild processing is an error that does not require interruption of the rebuild processing.

Then, in step S608, the processor 102 performs error skip control processing. More specifically, the processor 102 causes the operation instructing unit 106 to send the rebuild processing resumption instruction to the disk array apparatus 250. In the present exemplary embodiment, the processor 102 can instruct the disk array apparatus 250 to resume the rebuild processing from a sector that follows the faulty sector. Alternatively, the processor 102 can instruct the disk array apparatus 250 to resume the rebuild processing from a head sector of the next used area.

After completing the processing in step S608 (i.e., after sending the rebuild processing resumption instruction), the processing returns to step S601, in which the processor 102 again sends the interrupt cause read command to the disk array apparatus 250. On the other hand, if it is determined that the faulty sector is not an unused area (NO in step S607), the processor 102 determines that the above-described error having been confirmed during the rebuild processing cannot be disregarded. Namely, the processor 102 recognizes the error. More specifically, in this case, the processor 102 determines that the rebuild processing cannot be continued due to the above-described error having been confirmed during the rebuild processing.

Then, in step S609, the processor 102 notifies a user of the occurrence of an HDD failure. For example, the host computer 100 displays a message that notifies a user of information identifying the failed HDD on a display device (not illustrated) and prompts the user to replace the failed HDD by a new HDD. Then, in step S611, the processor 102 completes the rebuild processing to be performed by the disk array system 1000 and terminates the processing of the flowchart illustrated in FIG. 13.

Further, if it is determined that the interrupt cause is not the error caused during the rebuild processing (NO in step S603), then in step S610, the processor 102 determines whether the interrupt cause is the rebuild processing completion cause. If it is determined that the interrupt cause is the rebuild processing completion cause (YES in step S610), then in step S611, the processor 102 completes the rebuild processing to be performed by the disk array system 1000 and terminates the processing of the flowchart illustrated in FIG. 13.

On the other hand, if it is determined that the interrupt cause is not the rebuild processing completion cause (NO in step S610), then in step S612, the processor 102 executes other processing according to the interrupt cause. Subsequently, the processing returns to step S601, in which the processor 102 sends again the interrupt cause read command to the disk array apparatus 250.

According to the above-described first exemplary embodiment, the host computer performs a trigger-based confirmation operation, in which an occurrence of any read error during the rebuild processing in the disk array apparatus is confirmed in response to an interrupt transmitted from the disk array apparatus. Further, according to the above-described second exemplary embodiment, the host computer performs a polling-based operation to confirm an occurrence of any read error during the rebuild processing in the disk array apparatus.

In a third exemplary embodiment of the present invention, the host computer can switch its operation between a first mode and a second mode. In the first mode, the host computer confirms an occurrence of a read error during the rebuild processing in the disk array apparatus according to the method described in the first exemplary embodiment. In the second mode, the host computer confirms an occurrence of a read error during the rebuild processing in the disk array apparatus according to the method described in the second exemplary embodiment.

In the above-described first exemplary embodiment, if the rebuild read error occurrence place (faulty sector) is an unused area, the host computer sends the rebuild processing resumption instruction to the disk array apparatus. In a fourth exemplary embodiment of the present invention, if the rebuild read error occurrence place (faulty sector) is an unused area, the host computer sends a faulty sector overwriting processing execution instruction, in addition to the rebuild processing resumption instruction, to the disk array apparatus.

Figure 14:
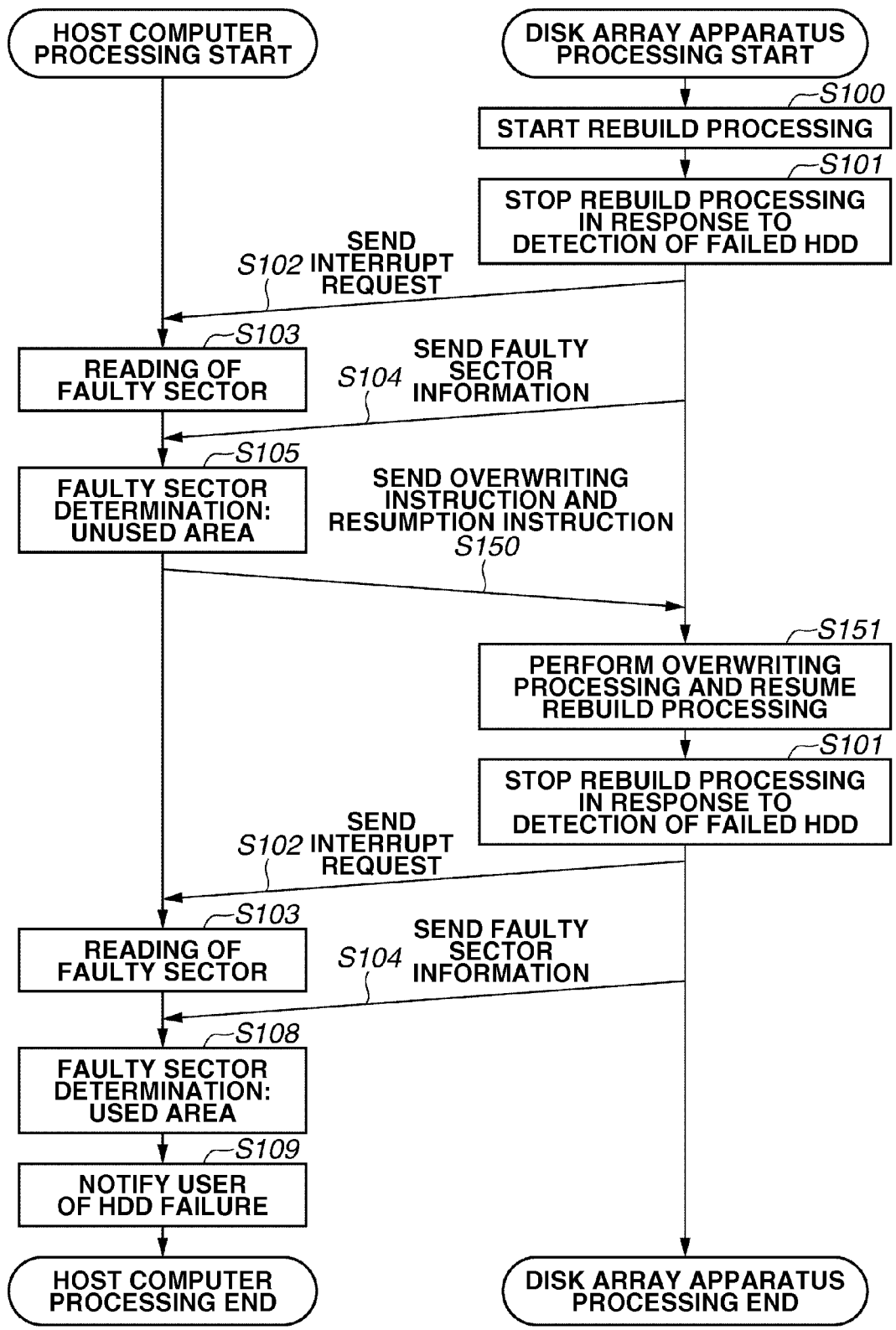
FIG. 14 illustrates a schematic flow of storage device array control processing that can be performed by a disk array system according to a fourth exemplary embodiment of the present invention.

FIG. 14 illustrates a schematic flow of storage device array control processing that can be performed by the disk array system 1000 according to the fourth exemplary embodiment. In the present exemplary embodiment, the RAID control unit 202 performs a control operation for the processing to be performed by the disk array apparatus 200. The processor 102 performs a control operation for the processing to be performed by the host computer 100. In the flowchart illustrated in FIG. 14, steps similar to those illustrated in FIG. 2 are denoted by the same step numbers.

First, processes to be performed in steps S100 to S105 illustrated in FIG. 14 are similar to the processes performed in steps S100 to S105 illustrated in FIG. 2 and, therefore, their descriptions are not repeated.

As a result of the faulty sector determination (in step S105), if the faulty sector (rebuild read error occurrence place) is an unused area, then in step S150, the operation instructing unit 106 of the host computer 100 sends the faulty sector overwriting processing execution instruction to the disk array apparatus 200. More specifically, the operation instructing unit 106 instructs the disk array apparatus 200 to execute overwriting processing using a fixed value (specific data) onto the faulty sector. Further, the operation instructing unit 106 sends the rebuild processing resumption instruction to the disk array apparatus 200. More specifically, the operation instructing unit 106 instructs the disk array apparatus 200 to resume the rebuild processing from a sector that follows the faulty sector.

If the disk array apparatus 200 receives the above-described notification, then in step S151, the RAID control unit 202 executes overwriting processing using a fixed value (specific data) on the faulty sector and resumes the rebuild processing from a sector that follows the faulty sector. In the present exemplary embodiment, the RAID control unit 202 determines the specific data to be used in the overwriting processing beforehand.

Alternatively, the processor 102 can designate the specific data to be used in the overwriting processing. The processes to be performed in subsequent steps illustrated in FIG. 14 are basically similar to the corresponding part of the processing illustrated in FIG. 2 and, therefore, their descriptions are not repeated.

Figure 15:
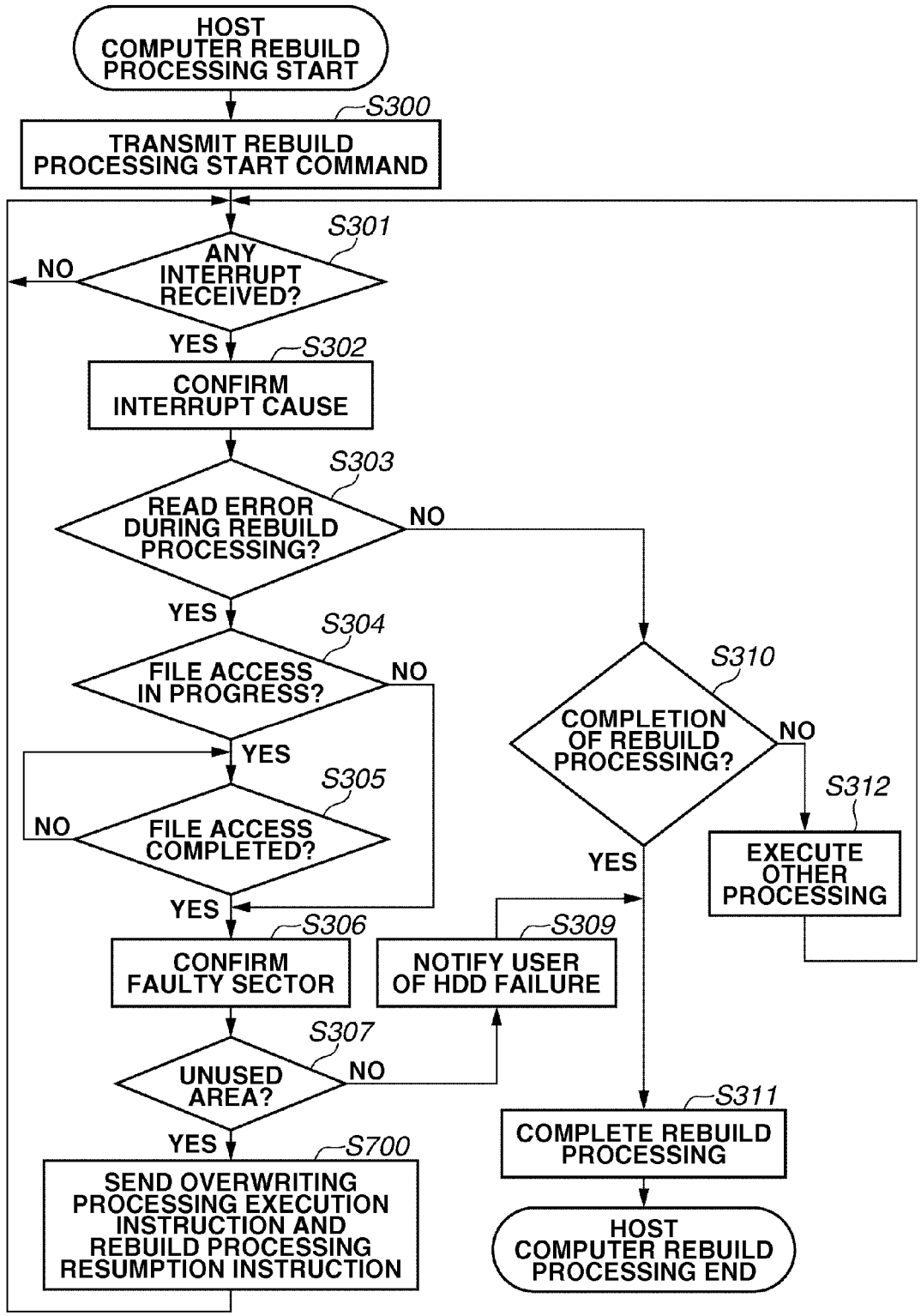
FIG. 15 is a flowchart illustrating an example of rebuild processing that can be performed by a host computer according to the fourth exemplary embodiment of the present invention.

FIG. 15 is a flowchart illustrating an example of the rebuild processing that can be performed by the host computer 100 according to the fourth exemplary embodiment. In the present exemplary embodiment, the processor 102 performs a control operation for the processing of the flowchart illustrated in FIG. 15. Further, it is presumed that the HDD 500 and the HDD 501 are normal HDDs and the remaining HDD 502 is a new HDD replaced due to a failure, although the present exemplary embodiment is not limited to a specific example. In the flowchart illustrated in FIG. 15, steps similar to those illustrated in FIG. 4 are denoted by the same step numbers.

First, processes to be performed in step S300 to step S307 illustrated in FIG. 15 are similar to the processes performed in step S300 to step S307 illustrated in FIG. 4 and, therefore, their descriptions are not repeated. If it is determined that the faulty sector (rebuild read error occurrence place) is an unused area (YES in step S307), then in step S700, the processor 102 performs error skip control processing.

More specifically, the processor 102 causes the operation instructing unit 106 to transmit an instruction for overwriting processing execution using a fixed value (specific data) on the faulty sector to the disk array apparatus 200. Further, the processor 102 causes the operation instructing unit 106 to transmit the rebuild processing resumption instruction to the disk array apparatus 200.

In the present exemplary embodiment, the processor 102 can designate data to be used in the overwriting processing. The processes to be performed in subsequent steps illustrated in FIG. 15 are basically similar to the corresponding part of the processing illustrated in FIG. 4 and, therefore, their descriptions are not repeated.

Through the above-described processing, when a rebuild read error occurs, a faulty sector can be restored to a normal state by overwriting the rebuild read error occurrence place (i.e., the faulty sector) with a data prepared beforehand or a data instructed by the host computer.

As a modified embodiment of the present invention, the above-described configuration of the fourth exemplary embodiment can be combined with the configuration of the third exemplary embodiment. More specifically, as described in the second exemplary embodiment, the host computer can perform a polling-based operation to confirm an occurrence of any read error during the rebuild processing in the disk array apparatus. Further, if the rebuild read error occurrence place (faulty sector) is an unused area, the host computer can instruct the disk array apparatus to execute the faulty sector overwriting processing and resume the rebuild processing.

Further, in the above-described first exemplary embodiment, if the rebuild read error occurrence place (faulty sector) is an unused area, the host computer sends the rebuild processing resumption instruction to the disk array apparatus. Further, in the above-described fourth exemplary embodiment, if the rebuild read error occurrence place (faulty sector) is an unused area, the host computer sends the faulty sector overwriting processing execution instruction and the rebuild processing resumption instruction to the disk array apparatus.

However, in a case where the faulty sector is an unused area, the host computer can switch its operation between a first notification mode and a second notification mode. In the first notification mode, the host computer sends the rebuild processing resumption instruction as described in the first exemplary embodiment. In the second notification mode, the host computer sends the faulty sector overwriting processing execution instruction in addition to the rebuild processing resumption instruction, as described in the fourth exemplary embodiment.

The above-described configurations and contents of various data can be modified appropriately considering their usage and purposes. The present invention is not limited to the above-described exemplary embodiments. For example, the present invention can be embodied as a system, an apparatus, a method, a program, or a storage medium. More specifically, the present invention can be applied to a system including a plurality of devices or to an independent apparatus including only one device.

As described above, the system according to each exemplary embodiment of the present invention can continuously execute the rebuild processing even when a rebuild error occurs in an unused area. In this case, the host computer can determine whether the error occurrence place (faulty sector) is an unused area. Therefore, in a case where no error occurs, the system performance can be prevented from deteriorating during the rebuild processing.

Further, as the file system is implemented in the host computer, the management status of each HDD completely coincides with the usage status of each HDD. Therefore, the used area/unused area determination can be accurately performed. Further, compared to a conventional configuration of the disk array apparatus that includes an HDD management table, the system according to the present invention can prevent the cost increase of the disk array apparatus and can simplify the configuration.

Further, the system according to the present invention can prevent the system performance from deteriorating during the rebuild processing in the disk array apparatus. Moreover, in a case where a storage device that constitutes a member of a storage device array having the RAID configuration is failed, the system according to the present invention can appropriately perform the data recovery processing.

As described above, the present invention causes the host computer and the disk array apparatus to cooperate with each other to realize a disk array system, in which the host computer manages storage devices and the disk array apparatus performs rebuild processing in such a way as to prevent performance deterioration and cost increase.

Further, the system according to present invention can perform rebuild processing in such a way as to recover the data from a failed storage device. Further, even when a rebuild error occurs, the system according to present invention can continuously perform the rebuild processing if a detected error can be disregarded, for example, when an error occurs in an unused area.

Further, when a rebuild read error occurs, a faulty sector can be restored to a normal state by overwriting the rebuild read error occurrence place (i.e., the faulty sector) with a data prepared beforehand or a data instructed by the host computer.

Aspects of the present invention can also be realized by a computer of a system or apparatus (or devices such as a central processing unit (CPU) or micro-processing unit (MPU)) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., a non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-107412 filed May 7, 2010, which is hereby incorporated by reference herein in its entirety.

What is claimed is:

1. A system establishing Redundant Arrays of Inexpensive Disks (RAID) including a plurality of storage devices, the system comprising:
    an execution unit configured to execute rebuild processing for restoring data stored in any one of the storage devices based on data stored in another of the storage devices;
    a stopping unit configured to stop the rebuild processing in response to a read error occurring during execution of the rebuild processing; and
    a control unit configured to perform control to resume the rebuild processing in response to a portion where the read error has occurred being in an unused area.

2. The system according to claim 1, wherein, in response to a portion where the read error has occurred not being in the unused area, the control unit performs control to issue a notification that a storage device in which the read error has occurred is failed.

3. The system according to claim 1, wherein the system includes a storage control apparatus and an information processing apparatus,
    wherein the storage control apparatus includes the execution unit and the stopping unit, and
    wherein the information processing apparatus includes the control unit.

4. A method of establishing Redundant Arrays of Inexpensive Disks (RAID) including a plurality of storage devices, the method comprising:
    executing rebuild processing for restoring data stored in any one of the storage devices based on data stored in another of the storage devices;
    stopping the rebuild processing in response to a read error occurring during execution of the rebuild processing; and
    performing control to resume the rebuild processing in response to a portion where the read error has occurred being in an unused area.

5. A non-transitory computer-readable storage medium storing a program capable of causing a computer to implement a method of establishing Redundant Arrays of Inexpensive Disks (RAID), the Redundant Arrays of Inexpensive Disks including a plurality of storage devices, the method comprising:
    executing rebuild processing for restoring data stored in any one of the storage devices based on data stored in another of the storage devices;
    stopping the rebuild processing in response to a read error occurring during execution of the rebuild processing; and
    performing control to resume the rebuild processing in response to a portion where the read error has occurred being in an unused area.

* * * * *